US012129747B2

(12) United States Patent
Mansir et al.

(10) Patent No.: US 12,129,747 B2
(45) Date of Patent: Oct. 29, 2024

(54) HYBRID PERMANENT MAGNET MOTOR

(71) Applicant: Halliburton Energy Services, Inc., Houston, TX (US)

(72) Inventors: Hassan Mansir, Frimley (GB); Jeffrey Frey, Tulsa, OK (US); Robert Charles De Long, Tulsa, OK (US); Dezhi Zheng, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 132 days.

(21) Appl. No.: 17/837,601

(22) Filed: Jun. 10, 2022

(65) Prior Publication Data

US 2023/0399928 A1      Dec. 14, 2023

(51) Int. Cl.
| | |
|---|---|
| *H02K 5/132* | (2006.01) |
| *E21B 43/12* | (2006.01) |
| *F04D 13/10* | (2006.01) |
| *H02K 7/00* | (2006.01) |
| *H02K 17/16* | (2006.01) |

(52) U.S. Cl.
CPC ............ *E21B 43/128* (2013.01); *F04D 13/10* (2013.01); *H02K 5/132* (2013.01); *H02K 7/003* (2013.01); *H02K 17/165* (2013.01)

(58) Field of Classification Search
CPC ....... E21B 43/128; F04D 13/10; H02K 5/132; H02K 7/003; H02K 17/165
See application file for complete search history.

(56) References Cited

U.S. PATENT DOCUMENTS

| | | | |
|---|---|---|---|
| 4,358,697 A | 11/1982 | Liu et al. | |
| 6,091,168 A * | 7/2000 | Halsey | H02K 9/02 310/58 |
| 6,727,627 B1 | 4/2004 | Sasaki et al. | |
| 7,365,466 B2 * | 4/2008 | Weihrauch | H02K 1/276 310/216.116 |

(Continued)

FOREIGN PATENT DOCUMENTS

| | | |
|---|---|---|
| CN | 103545997 A | 1/2014 |
| CN | 111181259 A | 5/2020 |

(Continued)

OTHER PUBLICATIONS

Filing Receipt, Specification and Drawings for U.S. Appl. No. 17/837,610, filed Jun. 10, 2022, entitled "Permanent Magnet Motor," 94 pages.

(Continued)

*Primary Examiner* — Tran N Nguyen
*Assistant Examiner* — Masoud Vaziri
(74) *Attorney, Agent, or Firm* — Conley Rose, P.C.; Rodney B. Carroll

(57) ABSTRACT

A downhole electric submersible pump (ESP) assembly. The downhole ESP assembly comprises a hybrid permanent magnet motor (PMM) comprising a first drive shaft, a stator, and a rotor comprising a first permanent magnet element, a second permanent magnet element, and an induction squirrel cage, wherein the rotor is mechanically coupled to the first drive shaft and disposed within the stator; a seal section having a second drive shaft coupled to the first drive shaft; and a pump assembly having a third drive shaft coupled to the second drive shaft.

20 Claims, 18 Drawing Sheets

(56) References Cited

U.S. PATENT DOCUMENTS

| | | | |
|---|---|---|---|
| 7,923,881 B2 * | 4/2011 | Ionel | H02K 1/276 310/156.79 |
| 10,385,856 B1 | 8/2019 | Shakirov et al. | |
| 2010/0038142 A1 * | 2/2010 | Snyder | F04C 2/1071 175/57 |
| 2010/0123426 A1 * | 5/2010 | Nashiki | H02K 1/146 310/46 |
| 2010/0133940 A1 | 6/2010 | Grossmann et al. | |
| 2011/0175480 A1 * | 7/2011 | Booth | H02K 1/278 310/156.47 |
| 2012/0181888 A1 * | 7/2012 | Shibukawa | H02K 1/276 310/156.01 |
| 2012/0274168 A1 * | 11/2012 | Holzner | H02K 1/246 310/156.53 |
| 2013/0020888 A1 * | 1/2013 | Anthony | H02K 1/141 310/52 |
| 2013/0088116 A1 * | 4/2013 | Chin | H02K 1/22 310/216.112 |
| 2013/0192821 A1 * | 8/2013 | Stoesz | E21B 4/04 166/250.01 |
| 2015/0372578 A1 | 12/2015 | Matsuda et al. | |
| 2016/0168964 A1 | 6/2016 | Li et al. | |
| 2016/0294268 A1 * | 10/2016 | Head | H02K 21/14 |
| 2016/0315527 A1 | 10/2016 | Clingman et al. | |
| 2017/0264179 A1 | 7/2017 | Khotsyanov et al. | |
| 2017/0241480 A1 * | 8/2017 | Parmeter | E21B 43/128 |
| 2017/0365377 A1 * | 12/2017 | Yun | H02K 3/30 |
| 2018/0233970 A1 * | 8/2018 | de Souza | H02K 1/2706 |
| 2019/0229569 A1 * | 7/2019 | Li | H02K 21/16 |
| 2020/0304002 A1 | 7/2020 | Amjad | |
| 2021/0199099 A1 | 7/2021 | Clingman | |
| 2021/0211004 A1 | 7/2021 | Wang et al. | |
| 2021/0372471 A1 * | 12/2021 | Beck | F04D 13/086 |
| 2022/0069646 A1 * | 3/2022 | Tang | H02K 1/2766 |
| 2022/0098961 A1 | 3/2022 | Xiao et al. | |

FOREIGN PATENT DOCUMENTS

| | | |
|---|---|---|
| KR | 10-1759698 B1 | 7/2017 |
| WO | 2016003309 A1 | 1/2016 |
| WO | 2021106682 A1 | 6/2021 |

OTHER PUBLICATIONS

Foreign Communication from Related Application—International Search Report and Written Opinion of the International Searching Authority, International Application No. PCT/US2022/035076, dated Mar. 3, 2023, 12 pages.

Foreign Communication from Related Application—International Search Report and Written Opinion of the International Searching Authority, International Application No. PCT/US2022/035074, dated Mar. 9, 2023, 11 pages.

Chaniotakis, George, "Make Permanent Magnet Synchronous Motor Generator DIY-Circuit!", Youtube URL: https://www.youtube.com/watch?v=08MY1mTXmLE&ab_channel=GEORGECHANIOTAKIS, Oct. 14, 2016, Youtube.com.

First Office Action dated Aug. 16, 2024 (31 pages), U.S. Appl. No. 17/837,610, filed Jun. 10, 2022.

* cited by examiner

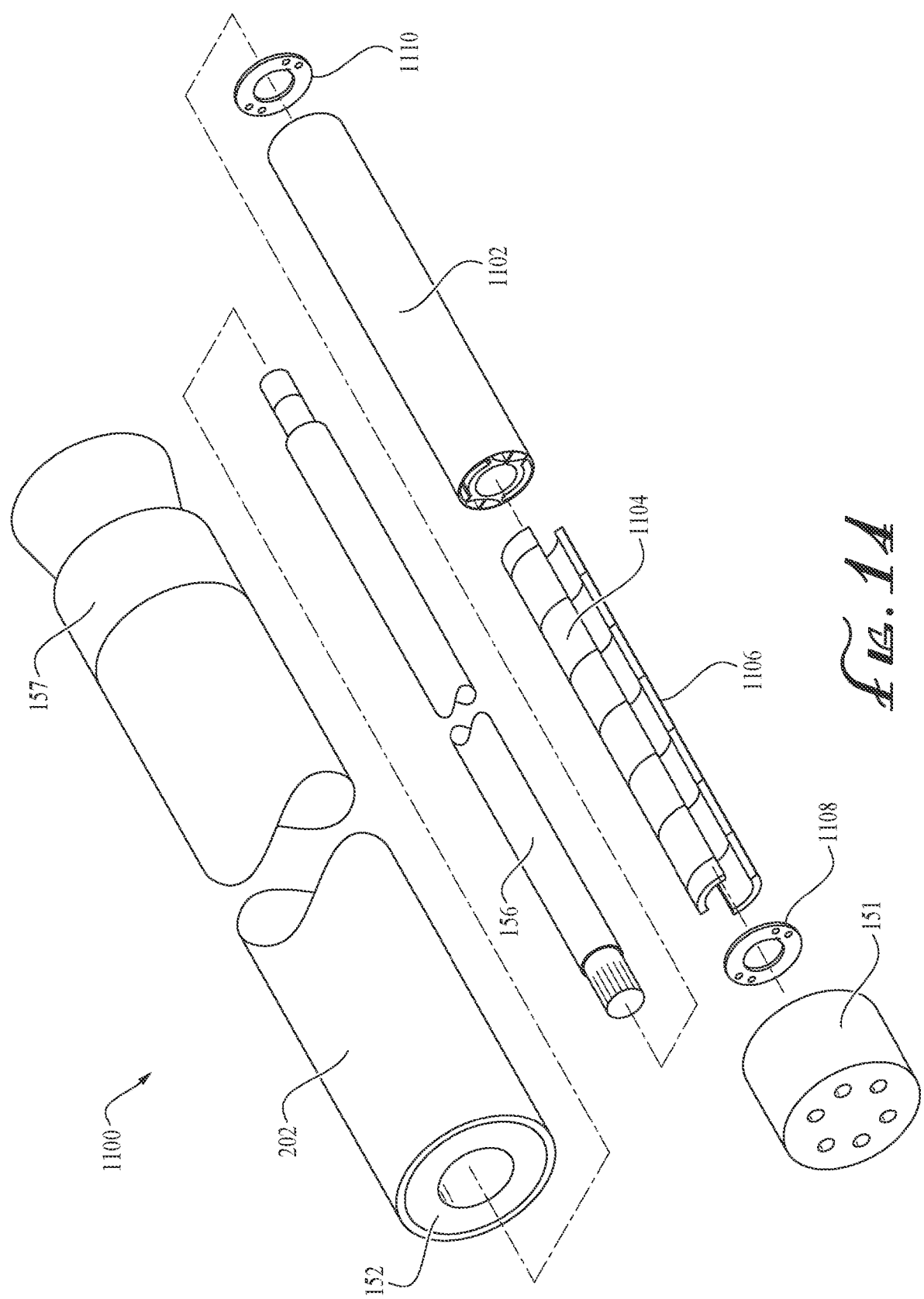

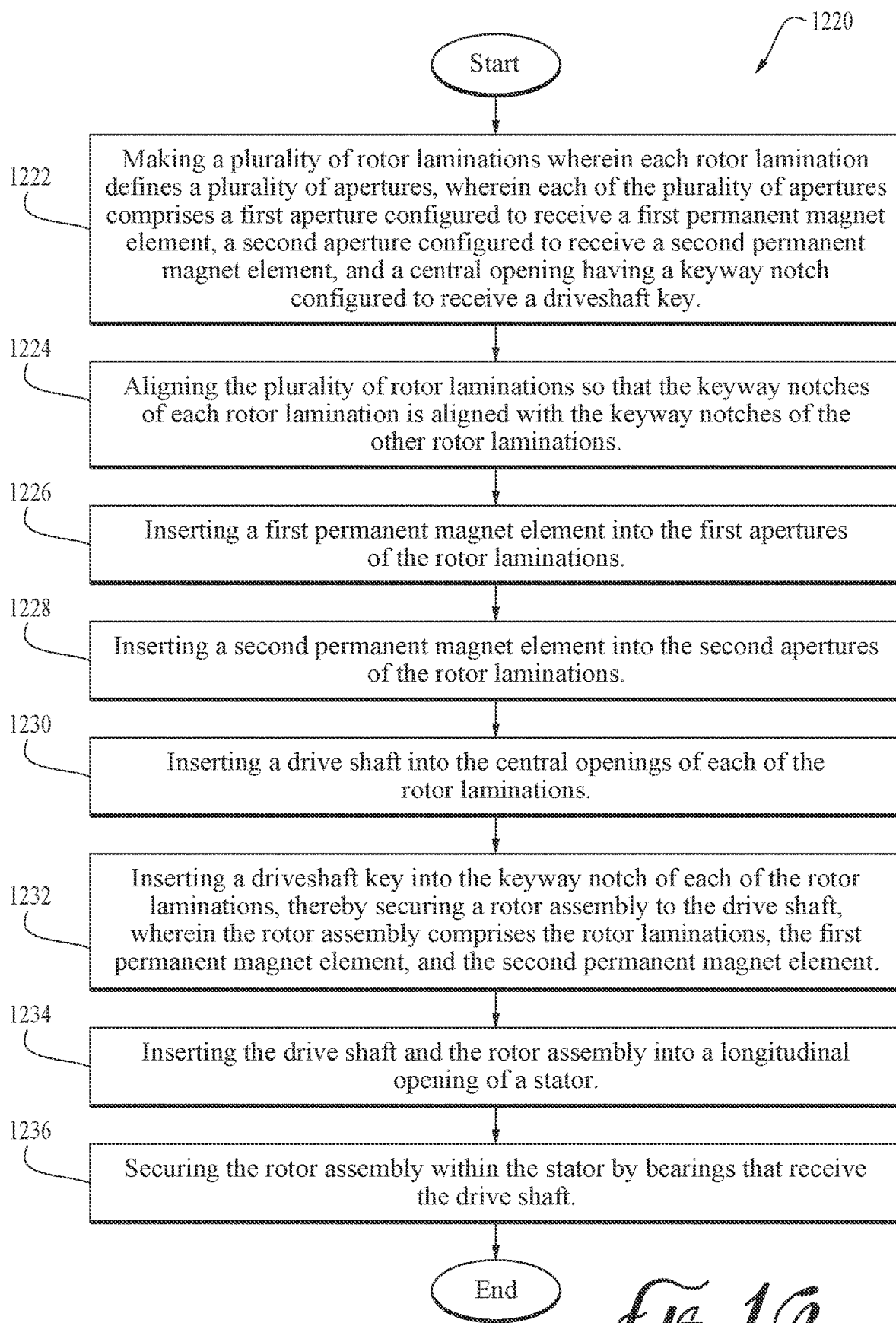

HYBRID PERMANENT MAGNET MOTOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons, such as oil and gas, are produced or obtained from subterranean reservoir formations that may be located onshore or offshore. The development of subterranean operations and the processes involved in removing hydrocarbons from a subterranean formation typically involve a number of different steps such as drilling a wellbore at a desired well site, treating the wellbore to optimize production of hydrocarbons, performing the necessary steps to produce the hydrocarbons from the subterranean formation, and pumping the hydrocarbons to the surface of the earth.

When performing subterranean operations, pump systems, for example, electric submersible pump (ESP) systems, may be used when reservoir pressure alone is insufficient to produce hydrocarbons from a well or is insufficient to produce the hydrocarbons at a desirable rate from the well. An ESP assembly typically comprises an electric motor that receives electric power from an electric power cable that extends from the electric motor to a source of electric power at the surface, a seal section located above the motor that isolates the clean dielectric oil sourced to the electric motor from wellbore fluids, and a pump assembly located above the seal section that receives production fluid through a fluid inlet and provides pump head to the production fluid to flow it out a pump discharge and up a production tubing to the surface. The pump assembly receives torque from a drive shaft in the seal section to produce pump head, and the drive shaft in the seal section receives torque from a drive shaft in the electric motor. ESP assemblies may be used in lifting hydrocarbon production fluids to the surface in hydrocarbon production applications and for lifting hot water to the surface in geothermal power production applications.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 14 is an illustration of a PMM according to an embodiment of the disclosure.

FIG. 16 is a flow chart of yet another method according to an embodiment of the disclosure.

DETAILED DESCRIPTION

Figure 1:
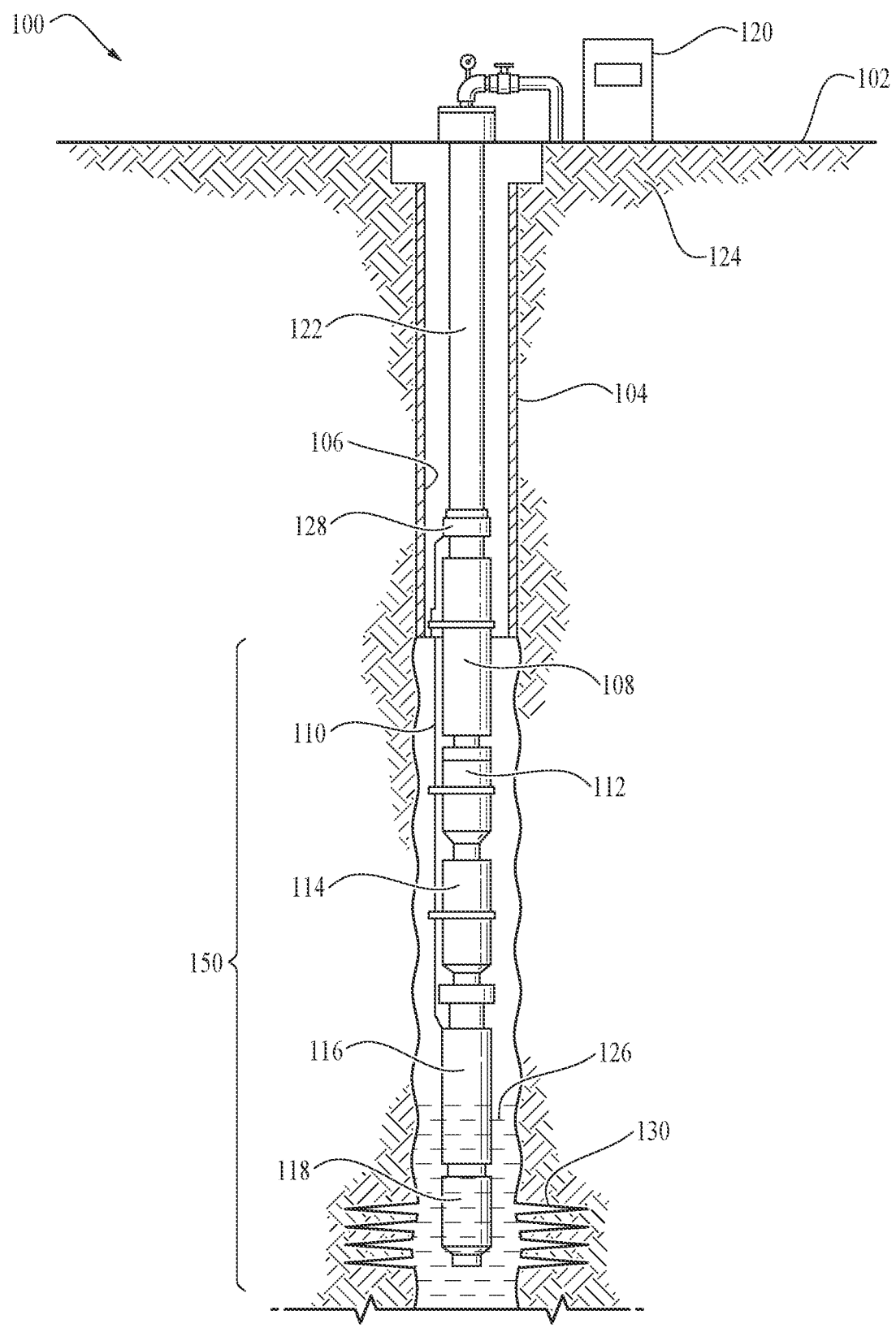
FIG. 1 is an illustration of an electric submersible pump assembly disposed in a wellbore according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Energy operating companies are asking for electric motors to deliver more power in downhole electric submersible pump (ESP) operations. ESPs provide lifting force (e.g., pump head) to flow production fluid up production tubing to a surface. This production fluid may be hydrocarbons in an oil or gas well. This production fluid can be hot water or other hot fluid in a geothermal well. Conventionally, electric motors are made more powerful by making the motors bigger. In a wellbore, the diameter of the ESP and the diameter of the electric motor are constrained by the diameter of the wellbore. Consequently, making the electric motor "bigger," in the downhole ESP context, conventionally involves making the electric motor longer. But a longer electric motor (of constant diameter) may be more susceptible to internal motor rotor strikes against the motor stator that may damage the motor. Additionally, a longer electric motor has difficulty passing bends in the trajectory of the wellbore during run-in. The present disclosure teaches a hybrid permanent magnet motor (PMM) that may deliver as much as fifty percent more power than a conventional electric motor having the same dimensions, significantly addressing this technical problem of providing increased power.

The hybrid PMM taught herein comprises a conventional stator portion that surrounds a hybrid rotor that includes an induction squirrel cage as well as permanent magnets. This hybrid PMM allows for retrofitting the hybrid rotor into a conventional stator of previously built ESP electric motors, thereby preserving significant investment in existing inventory. At the same time, this hybrid PMM can be built with new stators built using existing procedures and tooling. The conventional stator of this hybrid PMM receives power from conventional ESP electric power drives and/or motor controllers, and the hybrid rotor may provide 50% more shaft horsepower with the same current supplied from the conventional ESP electric power drive as compared with a conventional rotor.

The hybrid rotor provides torque in part based on magnetic flux produced by the induction squirrel cage during start up of the hybrid PMM. When the hybrid rotor is at steady state rotational speed (e.g., at about 3600 RPM), the torque is provided primarily based on the interaction between the magnetic flux produced by the permanent magnets in the hybrid rotor and the magnetic flux produced by rotating currents in the stator windings. At steady state rotational speed, the hybrid rotor is synchronized with the rotating currents in the stator windings, and hence minimal or no currents are induced in the induction squirrel cage. As a mechanical load from a pump assembly of the ESP varies, the rotational speed of the hybrid rotor may slow slightly or increase slightly, the hybrid rotor becomes slightly out of synchronization with the rotating currents in the stator windings, currents are induced in the induction squirrel cage, and the magnetic flux generated by the induced currents in the induction squirrel cage then interacts with the magnetic flux produced by the rotating currents in the stator windings to either increase the rotational speed or decrease the rotational speed of the hybrid rotor, thereby stabilizing the rotational speed of the hybrid rotor. The mechanical load from the pump assembly may vary as the fluid varies, for example, as the fluid comprises more or less gas phase fluid, for example, as the fluid comprises a portion of more sand or less sand, for example, as a viscosity of the fluid varies.

In an embodiment, the hybrid rotor comprises features that prompt the magnetic flux of the permanent magnets to follow a desired path that crosses a motor air gap and proceeds through the stator, maximizing torque generation, and that discourage the magnetic flux following an undesired leakage path, through the metal of the hybrid rotor itself to another one of the permanent magnets These features comprise air gaps where metal is not present, because magnetic flux flows much more easily through magnetic metal than through air gaps (i.e., magnetic metal of the hybrid rotor core, the magnetic metal of the drive shaft, and the magnetic metal of the stator have much higher magnetic permeability than the magnetic permeability of the air gaps or non-magnetic filler materials in the gaps).

Turning now to FIG. 1, a well site environment 100 is shown according to one or more aspects of the present invention. While well site environment 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges and land-based rigs. It is understood that the well site environment 100 may depict a hydrocarbon production context or a hot water production (e.g., geothermal) context.

In one or more embodiments, well site environment 100 comprises a wellbore 104 below a surface 102 in a formation 124. In one or more embodiments, a wellbore 104 may comprise a nonconventional, horizontal or any other type of wellbore. Wellbore 104 may be defined in part by a casing string 106 that may extend from a surface 102 to a selected downhole location. Portions of wellbore 104 that do not comprise the casing string 106 may be referred to as open hole.

In one or more embodiments, various types of hydrocarbons or geothermal fluids may be pumped from wellbore 104 to the surface 102 using an electric submersible pump (ESP) assembly 150 disposed or positioned downhole, for example, within, partially within, or outside casing 106 of wellbore 104. ESP assembly 150 may comprise a centrifugal pump assembly 108, an electric cable 110, an optional gas separator 112, a seal section or equalizer 114, a hybrid permanent magnet electric motor (PMM) 116, and a sensor package 118. In another embodiment, the ESP assembly 150 does not comprise the hybrid PMM 116 but in its place comprises a PMM 1100.

In an embodiment, the centrifugal pump assembly 108 may comprise one or more centrifugal pump stages, each centrifugal pump stage comprising an impeller mechanically coupled to a drive shaft of the centrifugal pump assembly 108 and a corresponding diffuser held stationary by and retained within the centrifugal pump assembly 108 (e.g., retained by a housing of the centrifugal pump assembly 108). In an embodiment, the centrifugal pump assembly 108 may not contain a centrifugal pump but instead may comprise a rod pump, a progressive cavity pump, or any other suitable pump system or combination thereof. In an embodiment, the centrifugal pump assembly 108 may be omitted and a centrifugal pump may be provided within an integral gas separator and pump assembly corresponding to the component labeled 112 in FIG. 1, where the centrifugal pump is located downstream of a crossover of the integral gas separator and pump assembly. A drive shaft of the hybrid PMM 116 provides torque to a drive shaft of the seal section 114. The drive shaft of the seal section 114 provides torque to a drive shaft of the centrifugal pump assembly 108 (or alternatively to a drive shaft in a gas separator 112 which in turn provides torque to the drive shaft of the centrifugal pump assembly 108).

The centrifugal pump assembly 108 may transfer pressure to the fluid 126 or any other type of downhole fluid to pump or lift the fluid from downhole to the surface 102 at a desired or selected pumping rate. Centrifugal pump assembly 108 couples to the optional gas separator 112. The optional gas separator 112 couples to the seal section or equalizer 114 which couples to the hybrid PMM 116. The hybrid PMM 116 may be coupled to a downhole sensor package 118. In one or more embodiments, an electric cable 110 is coupled to the hybrid PMM 116 and to a motor controller 120 at the surface 102. In some contexts, the motor controller 120 may be referred to as an electric power drive.

In an embodiment, the motor controller 120 provides three-phase alternating current electric power to a stator of the hybrid PMM 116. The electric cable 110 may provide power to the hybrid PMM 116, transmit one or more control or operation instructions from motor controller 120 to the hybrid PMM 116, or both. The electric cable 110 may be connected to the hybrid PMM 116 by a motor lead extension (MLE) that connects to stator windings of the hybrid PMM 116. The motor controller 120 may adapt the electric power provided via the electric cable 110 to the hybrid PMM 116 based on various operating conditions of the hybrid PMM 116 such as current or instantaneous angular velocity of the hybrid PMM 116 and/or current or instantaneous electric current sourced to the hybrid PMM 116. The motor controller 120 may monitor operating conditions in part by receiving signals from the sensor package 118. The sensor package 118 may provide information to the motor controller 120 about a current or instantaneous angular velocity of the hybrid PMM 116. The motor controller 120 may adapt voltage and/or current supplied to the hybrid PMM 116 based on current operating conditions of the hybrid PMM 116. The motor controller 120 may adapt a frequency of the electric power supplied to the hybrid PMM 116 based on current operating conditions of the hybrid PMM 116.

In one or more embodiments, fluid 126 may be a multiphase wellbore fluid comprising one or more hydrocarbons. For example, fluid 126 may comprise a gas phase and a liquid phase from a wellbore or reservoir in a formation 124. In one or more embodiments, fluid 126 may enter the wellbore 104, casing 106 or both through one or more perforations 130 in the formation 124 and flow uphole to one or more intake ports of the ESP assembly 150. The centrifugal pump assembly 108 may transfer pressure to the fluid 126 by adding kinetic energy to the fluid 126 via centrifugal force and converting the kinetic energy to potential energy in the form of pressure. In one or more embodiments, centrifugal pump assembly 108 lifts fluid 126 to the surface 102. In some contexts, the fluid 126 may be referred to as reservoir fluid or production fluid.

Fluid pressure in the wellbore 104 causes fluid 126 to enter the optional gas separator 112. Gas separator 112 separates a gas phase or component from the liquid phase of fluid 126 before the gas phase enters centrifugal pump assembly 108. Alternatively, in an ESP assembly 150 lacking a gas separator 112, fluid 126 enters a fluid inlet coupled to the centrifugal pump assembly 108 and flows from the fluid inlet into the centrifugal pump assembly 108. In one or more embodiments, the hybrid PMM 116 is configured or operated to turn one or more components in the optional gas separator 112 and one or more pump stages of the centrifugal pump assembly 108.

Seal section or equalizer 114 may be a motor protector that serves to equalize pressure and keep motor oil separate from fluid 126. In one or more embodiments, a production tubing section 122 may couple to the centrifugal pump assembly 108 using one or more connectors 128 or may couple directly to the centrifugal pump assembly 108. In an embodiment, the connector 128 may comprise a discharge or a pump discharge. In one or more embodiments, any one or more production tubing sections 122 may be mechanically coupled together to extend the ESP assembly 150 into the wellbore 104 to a desired or specified location. In an embodiment, the production tubing 122 comprises coiled tubing. Any one or more components of fluid 126 may be pumped from centrifugal pump assembly 108 through production tubing 122 to the surface 102 for transfer to a storage tank, a pipeline, transportation vehicle, any other storage, distribution or transportation system and any combination thereof.

In a geothermal operation, the fluid 126 may be pumped from the centrifugal pump assembly 108 through the production tubing 122 to the surface 102 to pass through a heat exchanger and heat a circulating fluid passing through the heat exchanger and back to radiators to heat building interiors or to perform industrial process heating. Alternatively, the fluid 126 may be directed into an organic Rankine cycle machine located at the surface, for example transferring heat from the fluid 126 to an organic working fluid having a low temperature liquid-vapor phase change, where the working fluid is then expanded through a turbine or other expander of the organic Rankine cycle machine to convert thermal energy to mechanical power.

Figure 2:
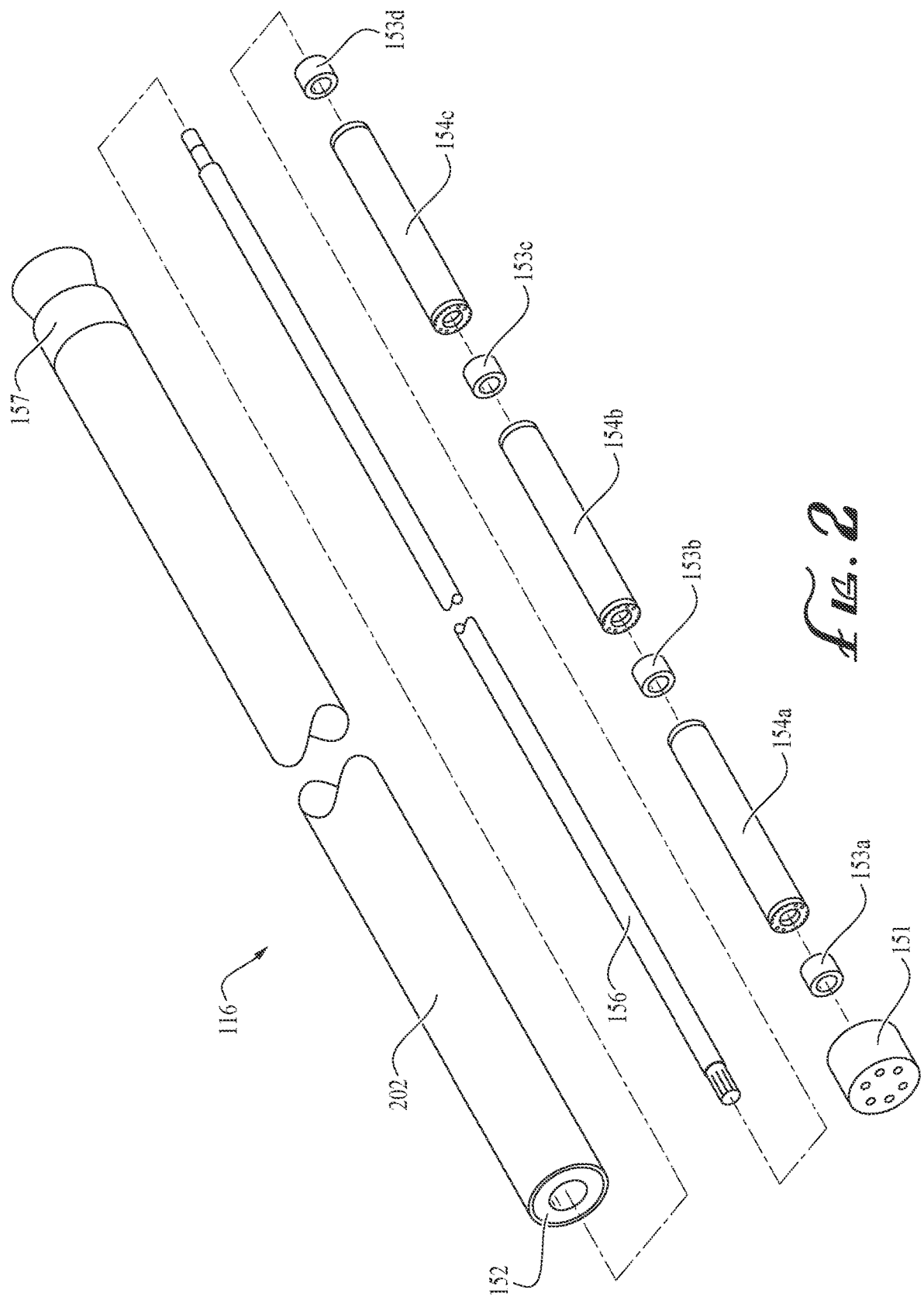
FIG. 2 is an illustration of a portion of a hybrid permanent magnet motor (PMM) according to an embodiment of the disclosure.

Turning now to FIG. 2, some of the components of the hybrid PMM 116 are shown. In an embodiment, the hybrid PMM 116 comprises a drive shaft 156 that is mechanically coupled to a hybrid rotor 154, and this assembly is inserted into a stator 152. The stator 152 is retained within a housing 202. In an embodiment, a plurality of hybrid rotors 154—for example a first hybrid rotor 154a, a second hybrid rotor 154b, and a third hybrid rotor 154c—are coupled to the drive shaft 156. While FIG. 2 illustrates three hybrid rotors, in another embodiment, the hybrid PMM 116 comprises a single hybrid rotor 154, two hybrid rotors 154, four hybrid rotors, five hybrid rotors, or more hybrid rotors. In some contexts, the hybrid rotors 154a, 154b, 154c may be referred to as hybrid rotor modules and the complete assembly of multiple hybrid rotor modules may be referred to as a hybrid rotor 154. While not illustrated as such in FIG. 2, the stator 152 may comprise a plurality of stator modules, and the complete assembly of multiple stator modules may be referred to as the stator 152. The number of stator modules may correspond to the number of hybrid rotor modules. Each stator module may comprise stator windings retained by a stator core formed of laminations. Each lamination of the stator core may be a flat sheet of magnetic metal that defines apertures to receive the stator windings. The laminations of the stator core are maintained in rotational alignment such that corresponding apertures of the laminations line up with each other. The laminations may be coated with an insulating material to reduce eddy currents between the laminations of the stator core. In an embodiment, the stator core may be a solid core of magnetic metal and may not be formed by assembly a plurality of laminations.

In an embodiment, the plurality of hybrid rotors 154 are sandwiched between bearings 153—for example first bearing 153a, second bearing 153b, third bearing 153c, and fourth bearing 153d. The bearings 153 may be supported by corresponding structures (not shown) attached to the inside of the stator 152 or to the inside of the housing 202. The bearings 153 support and stabilize the drive shaft 156 and maintain an air gap between an outside of the hybrid rotor 154 and the inside of the stator 152. The bearings 153 may be referred to as bearing bushings in some contexts. An uphole end of the hybrid PMM 116 may comprise a head 157, and a downhole end of the hybrid PMM 116 may comprise a base 151. The head 157 may provide features for coupling the hybrid PMM 116 to the seal section 114, and the base 151 may provide features for coupling the sensor package 118 to the hybrid PMM 116.

This hybrid PMM 116 can easily be built by retrofitting a conventional electric induction motor by removing the conventional rotor from the conventional stator 152 and installing the hybrid rotor 154 of the present disclosure into the conventional stator 152. In some contexts, the conventional rotor may be referred to as a conventional induction rotor: e.g., a rotor comprising a core and an induction squirrel cage and NOT including any permanent magnet elements. A conventional induction rotor does not have any permanent magnets and has either (a) an induction squirrel cage or (b) a set of windings (e.g., a wound rotor). It is noted that induction motors used in downhole ESP assemblies typically do not use wound rotors, but the wound rotor alternative is identified herein for completeness. The housing 202, the stator 152, and the motor controller 120 associated with the conventional electric motor can be used unchanged with the hybrid rotor 154. In an embodiment, the motor controller 120 provides three-phase alternating current electric power to the stator 152 (e.g., to the windings of the stator 152). This hybrid PMM 116 can also be built by retrofitting a permanent magnet motor by removing the permanent magnet motor rotor (e.g., a permanent magnet motor rotor that does not have an induction squirrel cage) from the conventional stator 152 and installing the hybrid rotor 154 of the present disclosure into the conventional stator 152. This ability to easily build the hybrid PMM 116 by retrofitting an existing electric motor can promote the rapid production and deployment of hybrid PMM 116 to meet customer demand for ESP electrical motors with increased power.

Figure 3:
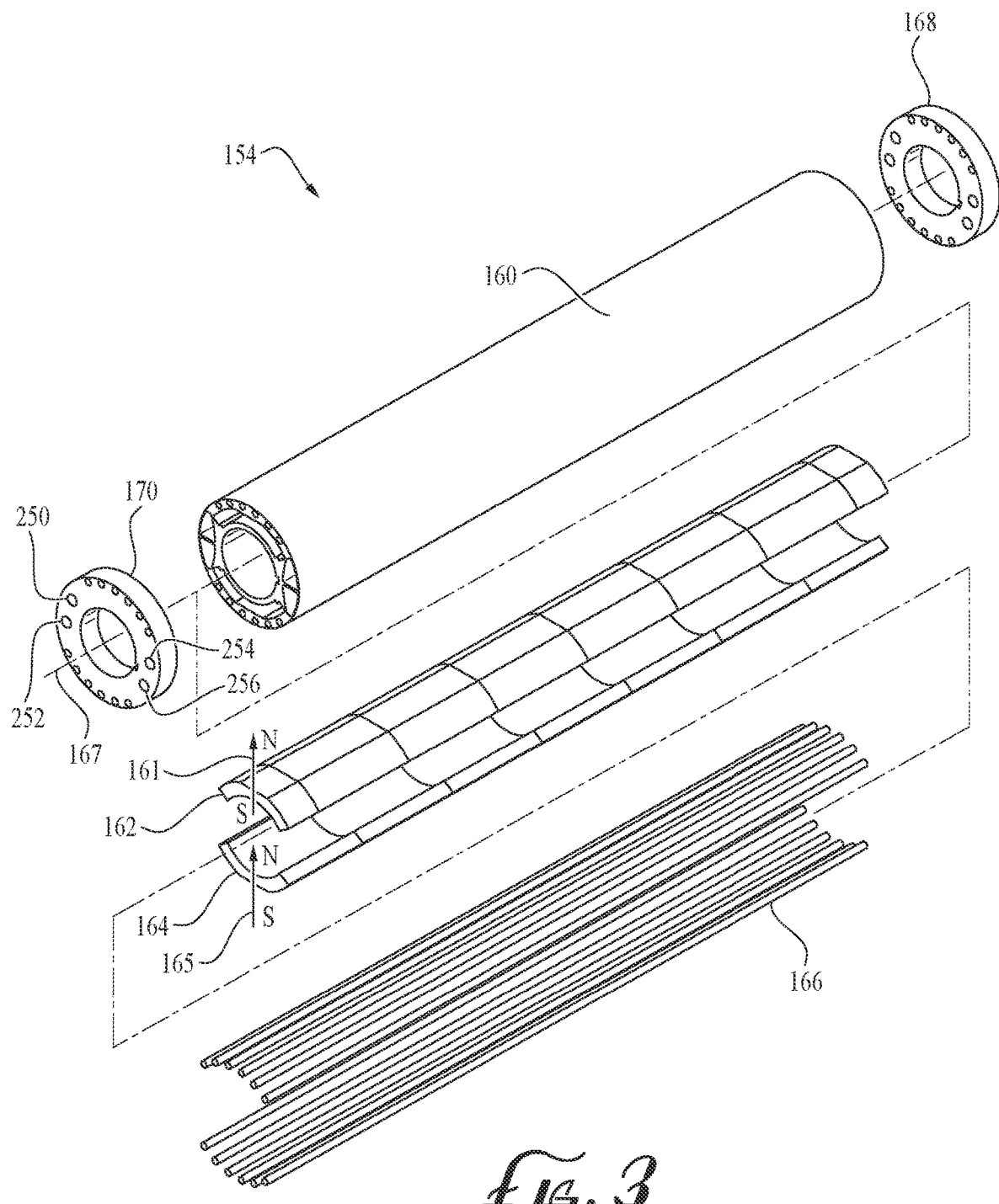
FIG. 3 is an illustration of a portion of a hybrid rotor of a hybrid PMM according to an embodiment of the disclosure.

Turning now to FIG. 3, some of the components of the hybrid rotor 154 are shown. It is understood that the hybrid rotor 154 in FIG. 3 may be one of a plurality of hybrid rotors 154 or hybrid rotor modules that are mechanically coupled to the drive shaft 156. In an embodiment, the hybrid rotor 154 comprises a core 160, a first permanent magnet element 162, a second permanent magnet element 164, a plurality of squirrel cage conductors 166, a first end ring 168, and a second end ring 170. In some contexts, the end rings 168, 170 may be referred to as shorting rings. In an embodiment, the end rings 168, 170 define apertures that align with channels in filler structures described below with reference to FIG. 8A and FIG. 8B. For example, the first end ring 168 may comprise a first opening 250, a second opening 252, a third opening 254, and a fourth opening 256.

In an embodiment, the first permanent magnet element 162 may be magnetized as indicated by field orientation arrow 161 with magnetic north directed upwards away from a centerline 167 of the rotor 154 and with magnetic south directed downwards towards the centerline 167 of the rotor 154. In an embodiment, the second permanent magnet element 164 may be magnetized as indicated by field orientation arrow 165 with magnetic south directed downwards away from the centerline 167 of the rotor 154 and with magnetic north directed upwards towards the centerline 167 of the rotor 154. By convention, magnetic flux is considered to flow in the direction from south to north, as indicated by the field orientation arrows 161, 165 in FIG. 3. While FIG. 3 is consistent with a two-pole hybrid rotor 154, in another embodiment, a four-pole hybrid rotor having four permanent magnet elements may be used. In another embodiment, a hybrid rotor with more than four poles may be used and it would have a like number of permanent magnet elements. In an embodiment, the hybrid rotor may have six poles. In an embodiment, the hybrid rotor may have twelve poles. In an embodiment, the first permanent magnet element 162 may be formed of a first plurality of separate permanent magnet segments, and the second permanent magnet element 164 may be formed of a second plurality of separate permanent magnet segments, as described more fully below with reference to FIG. 6A, FIG. 6B, and FIG. 7.

The term 'permanent magnet' is well-known in the art of electric machines. A permanent magnet is understood to refer to a material that retains its magnetic properties in the absence of an external magnetic field, for example in the absence of an external magnetic field generated by a coil or wires wound around a bobbin that is supplied with electric current. Not wishing to be bound by theory, the magnetic properties of a material are the result of electrons in motion. In atoms, each electron has a spin property. When the electron spin properties do not balance out in the electron shells of an atom, they result in the atom having a magnetic moment. However, this spin unbalance alone is insufficient to create magnetism. Magnetism of a permanent magnet is the result of aggregation and interchange between neighboring atoms that create magnetic domains which exhibit a net and significant magnetic moment. Magnets and magnetic materials may be made from pure metals such as iron, nickel or cobalt. Alloys of these metals or alloys of these metals combined with other elements such as rare earths can also be made into magnetic material. Some of the alloys can only be temporarily magnetized, and magnets made from such materials are described as soft magnets. Some of the alloys can be permanently magnetized, and magnets made from these materials are described as hard magnets or permanent magnets. One method of making modern permanent magnets may involve sintering a blended mix of materials at temperature, applying an external magnetic field to the magnetic material, and cooling the magnetic material while still applying the external magnetic field. In some methods, the magnetic material may be hammered and/or vibrated during the cooling process while the external magnetic field continues to be applied. Not wishing to be bound by theory, this process may cause the formation of the domain structures of the magnetic material, when heated, to align with the externally applied magnetic field and to harden permanently in this alignment as the magnetic material cools. It is understood, notwithstanding the term 'permanent' in permanent magnet, that a permanent magnet may become demagnetized under some conditions such as heating of the permanent magnet above its Curie temperature and/or subjecting the permanent magnet to intense mechanical shocks. A permanent magnet may also become progressively demagnetized over an extended period of time, for example when operated in a hot environment below the Curie temperature of the permanent magnet and/or when operated in proximity to countervailing externally generated magnetic fields (e.g., magnetic fields generated by electric currents in a stator winding).

In an embodiment, the core 160 may be formed by assembling a plurality of metal laminations 172 described below with reference to FIG. 4. The metal laminations 172 define a plurality of apertures or holes that line up when the metal laminations 172 are aligned to form the core 160. For example, the metal laminations 172 may be stacked on a mandrel and aligned using keyway notches 184 in the metal laminations 172 illustrated in FIG. 4 and described below. In some embodiments, however, the core 160 may not be formed by assembly a plurality of metal laminations and instead may be a solid core 160 formed of magnetic metal. A solid core may be made by a casting process or by an extrusion process. The plurality of apertures may be drilled, filed, sawed or otherwise machined into the solid core 160.

The apertures receive the permanent magnet elements 162, 164 and the squirrel cage conductors 166. The squirrel cage conductors 166 may comprise copper bars, copper rods, aluminum bars, aluminum rods, or other suitable highly conductive metal material. After the squirrel cage conductors 166 are installed into their apertures in the core 160, the first end ring 168 is electrically connected with the ends of the squirrel cage conductors 166 to the right in FIG. 3, and the second end ring 170 is electrically connected with the ends of the squirrel cage conductors 166 to the left in FIG. 3. The end rings 168, 170 may be electrically connected by brazing or soldering to the ends of the squirrel cage conductors 166. The structure formed by the squirrel cage conductors 166, the first end ring 168, and the second end ring 170 is commonly referred to as a 'squirrel cage' in the electrical machine art because of its resemblance to an exercise cage for squirrels or hamsters. The 'squirrel cage' is formed by the plurality of squirrel cage conductors 166 disposed circumferentially about the core 160 and extending the length of the rotor 154, connected at each end by the end rings 168, 170, wherein the squirrel cage provides an induced current circuit that generates electromagnetic force (EMF) that interacts with the stator 152 during some operating modes (e.g., during transient slippage or asynchronous operation) of the hybrid PMM 116.

While twelve squirrel cage conductors 166 are illustrated in FIG. 3, in other embodiments a different number of squirrel cage conductors 166 may be employed. In combination with the teachings of the present disclosure, well-established design rules may be followed to determine a desirable number of squirrel cage conductors 166 to use in a given design of a hybrid PMM 116. For a stator 152 of a two-pole motor design having eighteen stator slots, a common ESP motor configuration, twelve squirrel cage conductors 166 are recommended. In an embodiment, selection of the thickness of the squirrel cage conductors 166 can be established by an iterative process involving optimization of the operating point of magnetic metal of the rotor core 160 at start-up and at full-load. It is desirable to avoid excessive magnetic saturation of the magnetic metal of the rotor core 160 under all operating conditions while maintaining the maximum diameter of the squirrel cage conductors 166.

Figure 4:
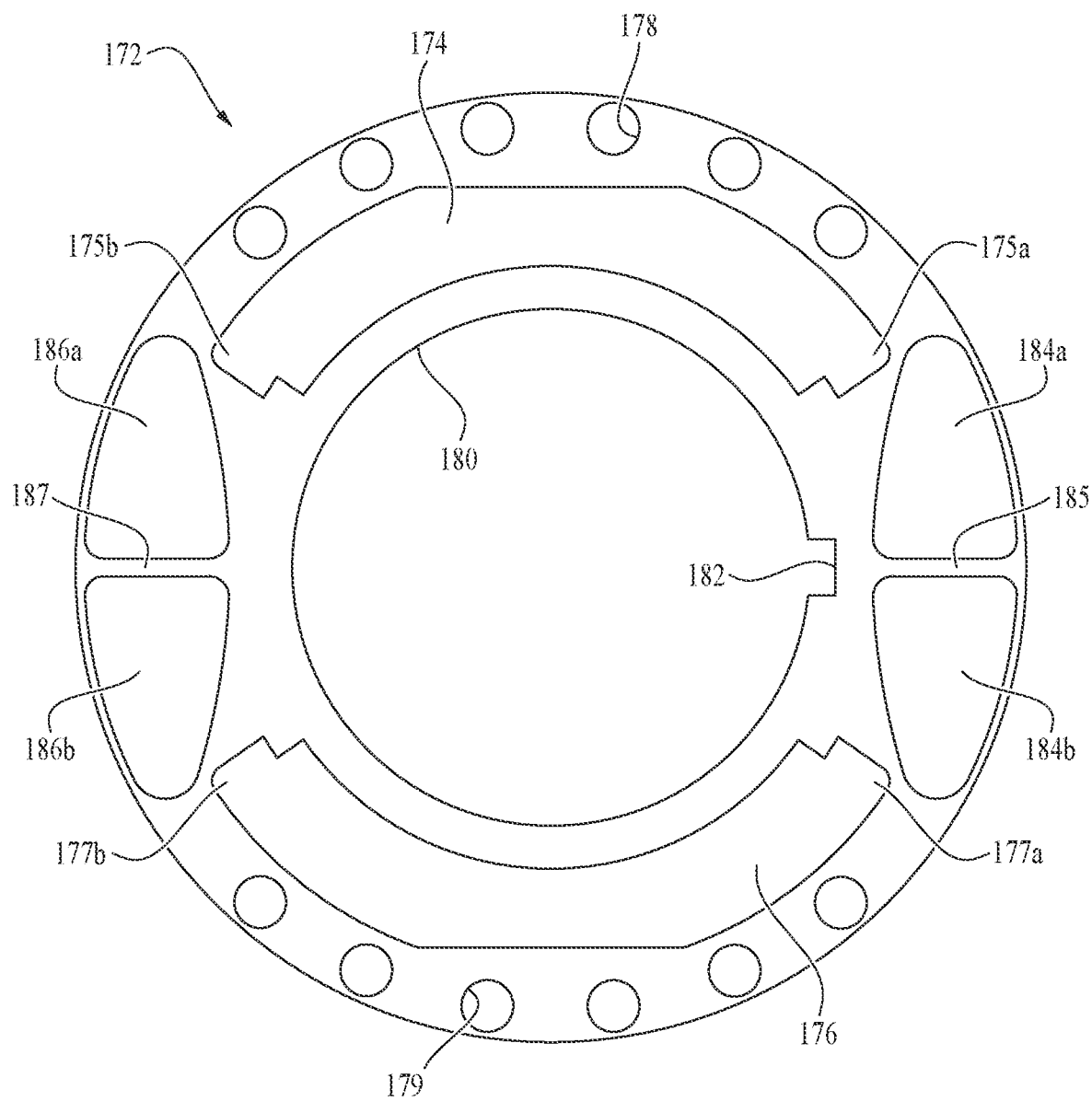
FIG. 4 is an illustration of a lamination of a hybrid rotor of a hybrid PMM according to an embodiment of the disclosure.

Turning now to FIG. 4, details of a metal lamination 172 are shown and described. It is understood that each of the metal laminations that make up the core 160 are substantially similar to the metal lamination 172 illustrated in FIG. 4 and described below. In an embodiment, the metal lamination 172 may be made of any magnetic metal material. The metal lamination 172 may comprise iron, nickel, and/or cobalt. The metal lamination 172 may comprise metal that is an alloy of iron, nickel, and/or cobalt such as permalloy or mu-metal (both alloys of nickel and iron), steel, and/or silicon steel (e.g., steel with silicon added, which reduces eddy current losses and hysteresis losses). The metal lamination 172 may be coated with insulation material and then cured. The electrically isolated metal laminations 172 reduce eddy currents in the core 160 and thereby make the hybrid PMM 116 more efficient. In an embodiment, the thickness of the metal lamination 172 is related to an operating frequency of the electric power supplied to the stator 152. In an embodiment, the thickness of the metal lamination 172 is between 0.45 mm and 0.80 mm. In an embodiment, the thickness of the metal lamination 172 is between 0.55 mm and 0.70 mm (e.g., when a 60 Hz electric power frequency is supplied by the motor controller 120). The outside diameter of the metal lamination 172 is substantially circular. The metal lamination 172 is a flat metal sheet.

The metal lamination 172 is provided with a plurality of apertures, whereby to define cavities in the core 160 (e.g., when the plurality of metal laminations are aligned and assembled to form the core 160) that are configured to receive rotor components such as permanent magnet elements 162, 164 and squirrel cage conductors 166. In an embodiment, the cavities defined in the core 160 also provide flux barriers that promote magnetic flux of the permanent magnet elements 162, 164 flowing efficiently across an air gap between the hybrid rotor 154 and the stator 152 and avoiding flux leakage between the permanent magnet elements 162, 164. The flux barriers define regions of low magnetic permeability relative to the high magnetic permeability of the magnetic metal of the core 160. For example, the relative magnetic permeability of flux barriers may be about 0.8 to 3.0; while the relative magnetic permeability of magnetic metal of the core 160 may be 1000 times as high or more, for example relative magnetic permeability from 800 to 200,000. In different embodiments, there may be different numbers of these apertures. The apertures described with reference to FIG. 4 are associated with a two-pole rotor configuration, but in other embodiments a different pattern of apertures may be provided to provide a four-pole rotor configuration, a six-pole rotor configuration, or some other number of poles rotor configuration. It happens, however, that a two-pole rotor configuration is best matched with legacy motor controllers 120 which commonly operate with 60 Hz electrical sources. Likewise, while twelve apertures for squirrel cage conductors 166 are shown in FIG. 4, in other embodiments, a different number of squirrel cage conductors 166 may be provided for. The apertures in the metal lamination may be provided by a stamping process or by a cutting process.

In an embodiment, a first aperture 174 is provided to define a first magnet pocket or cavity in the core 160 to receive the first permanent magnet element 162, and a second aperture 176 is provided to define a second magnet pocket or cavity in the core 160 to receive the second permanent magnet element 164. Many conventional permanent magnet motors employ a surface mount design in which the permanent magnets are affixed to an outside surface of the rotor. The permanent magnets may be glued to the surface and may be retained within a membrane, sleeve, or wrapper of carbon or glass fiber or composite material. There are a number of drawbacks of this conventional permanent magnet design that the hybrid PMM 116 of the present disclosure avoids or overcomes. The surface mounted permanent magnets may be exposed to demagnetization fields and lose their magnetic properties over time. By contrast, the permanent magnet elements 162, 164 of the present disclosure are retained within cavities of the metal laminations 172 and are protected from such demagnetization fields. Additionally, the manufacture of the hybrid rotor 154 is simplified because there is no need to envelope the permanent magnet elements 162, 164 in a securing membrane, sleeve, or wrapper. In the case of the conventional permanent magnet motor, the permanent magnets may desirably be ground very precisely to achieve a precise outside diameter (OD) of the rotor. By contrast, in an embodiment, the permanent magnet elements 162, 164 (or permanent magnet segments discussed below with reference to FIG. 6A, FIG. 6B, and FIG. 7) of the hybrid rotor 154 disclosed herein may not need to be ground so precisely, thereby making their manufacture simpler.

In an embodiment, the first aperture 174 is provided with a first flux barrier 175a and a second flux barrier 175b, and the second aperture 176 is provided with a third flux barrier 177a and a fourth flux barrier 177b. In some contexts, the first aperture 174 may be said to define the first flux barrier 175a and the second flux barrier 175b, for example, when the plurality of metal laminations 172 are aligned and assembled to form the core 160. In some contexts, the second aperture 176 may be said to define the third flux barrier 177a and the fourth flux barrier 177b. When the first permanent magnet element 162 is inserted into the first magnet pocket or cavity in the core 160 defined by the first aperture 174, the flux barriers 175a, 175b are not filled with the first permanent magnet element 162 and define voids that impede magnetic flux (e.g., has low magnetic permeability relative to the metal in the laminations 172 of the core 160) passing through the flux barriers 175a, 175b. Likewise, when the second permanent magnet element 164 is inserted into the second magnet pocket or cavity in the core 160 defined by the second aperture 176, the flux barriers 177a, 177b are not filled with the second permanent magnet element 164 and define voids that impede magnetic flux passing through the flux barriers 177a, 177b. The flux barriers 175a, 175b, 177a, 177b reduce the leakage of magnetic flux between the permanent magnet elements 162, 164 and prompt the magnetic flux instead to cross a motor air gap defined between the outside of the hybrid rotor 154 and an inside of the stator 152, maximizing the magnetic flux that links the hybrid rotor 154 with the stator 152. It is noted that it is the magnetic flux from the permanent magnet elements 162, 164 that crosses the motor air gap and interacts with the windings in the stator 152 (e.g., interacts with the rotating magnetic fields generated by the rotating electric currents in the windings of the stator 152) that generates the portion of motor torque due to the permanent magnet elements 162, 164 of the hybrid PMM 116.

In an embodiment, a third aperture 184a provides a fifth flux barrier that complements the function of the first flux barrier 175a and a fourth aperture 184b that provides a sixth flux barrier that complements the function of the third flux barrier 177a. A fifth aperture 186a provides a seventh flux barrier that complements the function of the second flux barrier 175b, and a sixth aperture 186b provides an eighth flux barrier that complements the function of the fourth flux barrier 177b.

In an embodiment, a first rib 185 is left in the metal lamination 172 between the third aperture 184a and the fourth aperture 184b to provide support for the thin wall section of the metal lamination 172 at the outside edges of the third and fourth apertures 184a, 184b, and a second rib 187 is left in the metal lamination 172 between the fifth aperture 186a and the sixth aperture 186b to provide support for the thin wall section of the metal lamination 172 at the outside edges of the fifth and sixth apertures 186a, 186b. In an embodiment, the thickness of the ribs 185, 187 is designed to provide sufficient structural support for the thin wall section while remaining as thin as possible to minimize flux leakage due to the magnetic metal content of the ribs 185, 187. A thin rib 185, 187 saturates with a small amount of magnetic flux, thereby limiting the flux leakage through it. In practice, the thickness of the ribs 185, 187 can be determined by a design optimization process.

In an embodiment, the thickness of the ribs 185, 187 may be 1/32 inch wide to 1/3 inch wide (about 0.794 mm wide to about 8.47 mm wide). In an embodiment, the thickness of the ribs 185, 187 may be 1/16 inch wide to 1/4 inch wide (about 1.59 mm wide to about 6.35 mm wide). In an embodiment, the thickness of the ribs 185, 187 may be about 1/8 inch wide (about 3.18 mm wide). In an embodiment, the thickness of the ribs 185, 187 may be about 1/10 inch wide (about 2.54 mm wide).

In an embodiment, a plurality of apertures are provided to define cavities in the core 160 to receive squirrel cage conductors 166, for example, a first plurality of apertures 178 on a first side of the metal lamination 172 and a second plurality of apertures 179 on a second side of the metal lamination 172. While six apertures 178 and six apertures 179 are illustrated in FIG. 4, it is understood that different numbers of apertures for receiving squirrel cage conductors 166 may be provided in different embodiments.

A central aperture 180 is provided in the metal lamination 172 to receive the drive shaft 156. A keyway 182 is provided in the metal lamination 172 (e.g., a notch in the edge of the central aperture 180) to align with a corresponding keyway (not shown) in the drive shaft 156 to accept a key to mechanically couple the core 160 and the rotor 154 to the drive shaft 156.

Figure 5:
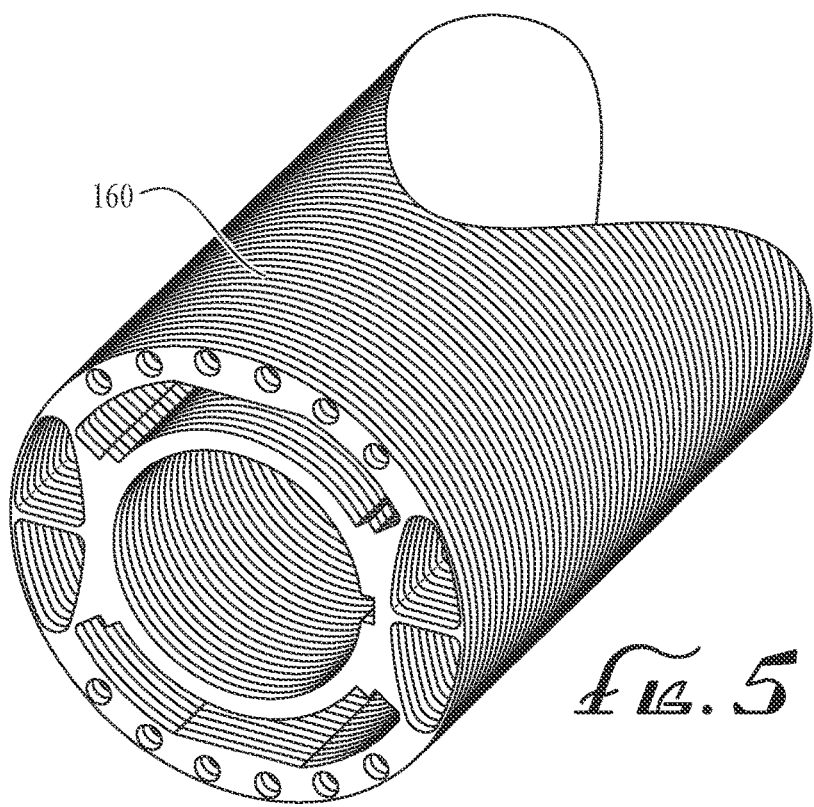
FIG. 5 is an illustration of a plurality of laminations assembled together to form a portion of a hybrid rotor of a hybrid PMM according to an embodiment of the disclosure.
Figure 6A:
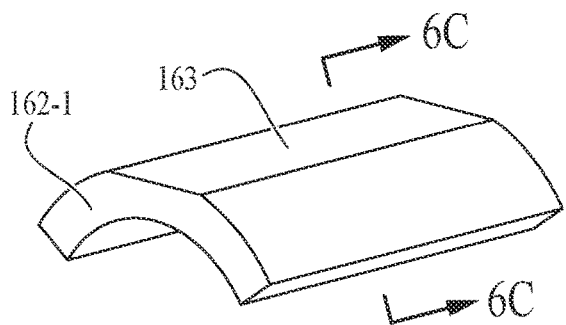
FIG. 6A is an illustration of a segment of a permanent magnet element for use in a hybrid rotor of a hybrid PMM according to an embodiment of the disclosure.
Figure 6B:
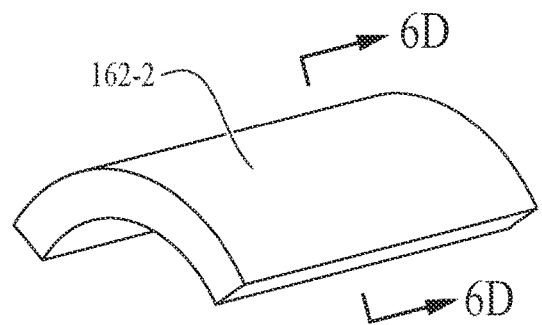
FIG. 6B is an illustration of a segment of a permanent magnet element for use in a hybrid rotor of a hybrid PMM according to another embodiment of the disclosure.
Figure 6C:
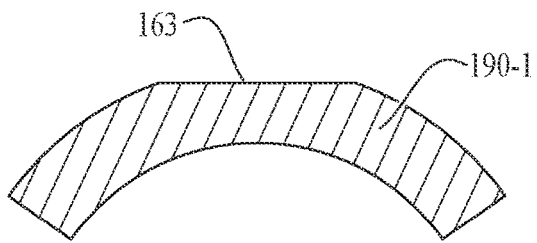
FIG. 6C is a cross-section illustration of the segment of the permanent magnet element shown in FIG. 6A according to an embodiment of the disclosure.
Figure 6D:
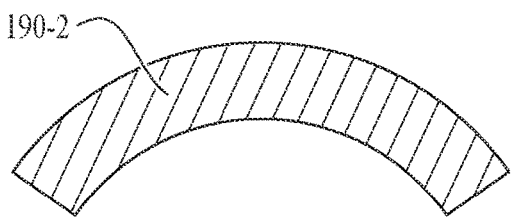
FIG. 6D is a cross-section illustration of the segment of the permanent magnet element shown in FIG. 6B according to an embodiment of the disclosure.

Turning now to FIG. 5, the core 160 is illustrated as comprising a plurality of metal laminations 172 stacked together in alignment. Turning now to FIG. 6A, in an embodiment, the first permanent magnet element 162 may be formed of a plurality of cropped permanent magnet segments 162-1, each having a cropped surface 163. As used herein the term 'cropped' refers to a curtailed arc, a trimmed arc, or a truncated arc of the cross-sectional shape of the permanent magnet element 162, 164 in some embodiments. For example, as seen in FIG. 6A and FIG. 6C, the outside arcuate surface (e.g., the longitudinal surface furthest from the centerline 167 of the hybrid rotor 154 when the cropped permanent magnet segment 162-1 is installed in the first magnet pocket defined by the first aperture 174) of the cropped permanent magnet segment 162-1 is clipped, truncated, curtailed, or trimmed, resulting in a flat cropped surface 163. The term cropped as used herein does not imply that the cropped permanent magnet segment 162-1 is first made in an uncropped shape and then is cropped. In an embodiment, a permanent magnet segment may be made initially uncropped and then machined to give it the cropped surface 163. In another embodiment, the permanent magnet segment may be initially formed to have the cropped surface 163 without a separate machining process. The second permanent magnet element 164 can be formed of a plurality of similarly cropped permanent magnet segments. In some contexts, permanent magnet segments may be referred to as permanent magnet sections. In an embodiment, the cropped surface 163 can improve the performance of the hybrid PMM 116 because this optimizes the flow of magnetic flux around the squirrel cage conductors 166. In an embodiment, the cropped surface 163 can improve the structural stiffness of the core 160 by further stabilizing the permanent magnet segments 162-1 in the first magnet pocket defined by the first aperture 174 in the lamination 172 (e.g., by preventing any sliding or rotation of the permanent magnet segment 162-1 in the pocket) and by stabilizing the permanent magnet segments 164 in the second magnet pocket defined by the second aperture 176 in the lamination 172. A cross-section 190-1 of the cropped permanent magnet segment is shown. Turning now to FIG. 6B, in another embodiment, the first permanent magnet element 162 may be formed of a plurality of non-cropped permanent magnet segments 162-2, and the second permanent magnet element 164 can be formed of like non-cropped permanent magnet segments. A cross-section 190-2 of the non-cropped permanent magnet segment is shown.

In an embodiment, the permanent magnet elements 162, 164 are formed of permanent magnet segments comprising rare earth magnets. In an embodiment, the permanent magnet elements 162, 164 are formed of permanent magnet segments comprising neodymium iron boron (NdFeB) material. In an embodiment, the permanent magnet elements 162, 164 are formed of permanent magnet segments comprising samarium cobalt (SmCo). Neodymium iron boron permanent magnets may have greater magnetic energy under optimal conditions than samarium cobalt permanent magnets but exhibit more rapid degradation of magnetic energy at the high temperatures that may be experienced in a downhole location in the wellbore 104 than is exhibited by samarium cobalt. In an embodiment, each of the permanent magnet segments may be made using a sintering process at temperature and under magnetization and using a press, for example using a hydraulically actuated press or an electrically actuated press. In an embodiment, the permanent magnet segments that are used to construct or build the permanent magnet elements 162, 164 are each separate permanent magnets.

Figure 7:
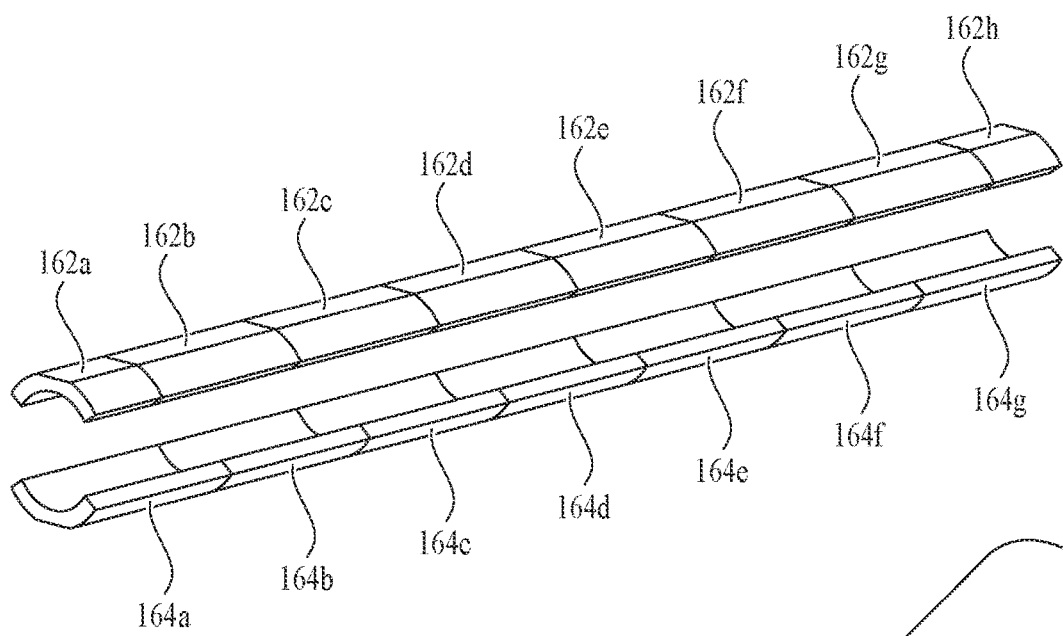
FIG. 7 is an illustration of staggering of a plurality of permanent magnet segments forming two permanent magnet elements for use in a hybrid rotor of a hybrid PMM according to an embodiment of the disclosure.

Turning now to FIG. 7, the staggering of boundaries of permanent magnet segments of the first permanent magnet element 162 versus the boundaries of permanent magnet segments of the second permanent magnet element 164 is shown. As used herein, "staggering" means that a cross-section of the permanent magnet elements 162, 164 that includes the boundary between two permanent magnet segments of the first permanent magnet element 162 slices through the middle or central portion of a permanent magnet segment of the second permanent magnet element 164, and a cross-section of the permanent magnet elements 162, 164 that includes the boundary between two permanent magnet segments of the second permanent magnet element 164 slices through the middle or central portion of a permanent magnet segment of the first permanent magnet element 162.

In an embodiment, the first permanent magnet element 162 comprises permanent magnet segments 162a, 162b, 162c, 162d, 162e, 162f, 162g, and 162h, and the second permanent magnet element 164 comprises permanent magnet segments 164a, 164b, 164c, 164d, 164e, 164f, and 164g. Each of the permanent magnet segments 162a, 162b, 162c, 162d, 162e, 162f, 162g, and 162h produces a magnetic field aligned with the field orientation arrow 161 illustrated in FIG. 3. Each of the permanent magnet segments 164a, 164b, 164c, 164d, 164e, 164f, and 164g produces a magnetic field aligned with the field orientation arrow 165 illustrated in FIG. 3. The permanent magnet segments are shown in FIG. 7 as being cropped permanent magnet segments but it is understood that they may be non-cropped permanent magnet segments. FIG. 7 illustrates that the boundaries between the permanent magnet segments 162a, 162b, 162c, 162d, 162e, 162f, 162g, 162h are staggered and do not align with the boundaries between the permanent magnet segments 164a, 164b, 164c, 164d, 164e, 164f, 164g. This staggering of the permanent magnet segments of the first permanent magnet element 162 versus the permanent magnet segments of the second permanent magnet element 164 provides stiffness and resistance to bending of the core 160. In an embodiment, the staggering of the permanent magnet segments 162a, 162b, 162c, 162d, 162e, 162f, 162g, 162h versus the permanent magnet segments 164a, 164b, 164c, 164d, 164e, 164f, 164g makes the segments 162a, 162b, 162c, 162d, 162e, 162f, 162g, 162h, 164a, 164b, 164c, 164d, 164e, 164f, 164g less susceptible to relative rotation under load conditions.

It is understood that the first permanent magnet element 162 may be formed from a different number of permanent magnet segments than is illustrated in FIG. 7 and that the second permanent magnet element 162 may be formed from a different number of permanent magnet segments than is illustrated in FIG. 7. In an embodiment, the permanent magnet segments may be about two inches long (about 50.8 mm long), and hence a great many more permanent magnet segments than shown in FIG. 7 may be used to form the permanent magnet elements 162, 164 by inserting the permanent magnet segments into the cavities formed by the first apertures 174 and the second apertures 176.

Figure 8A:
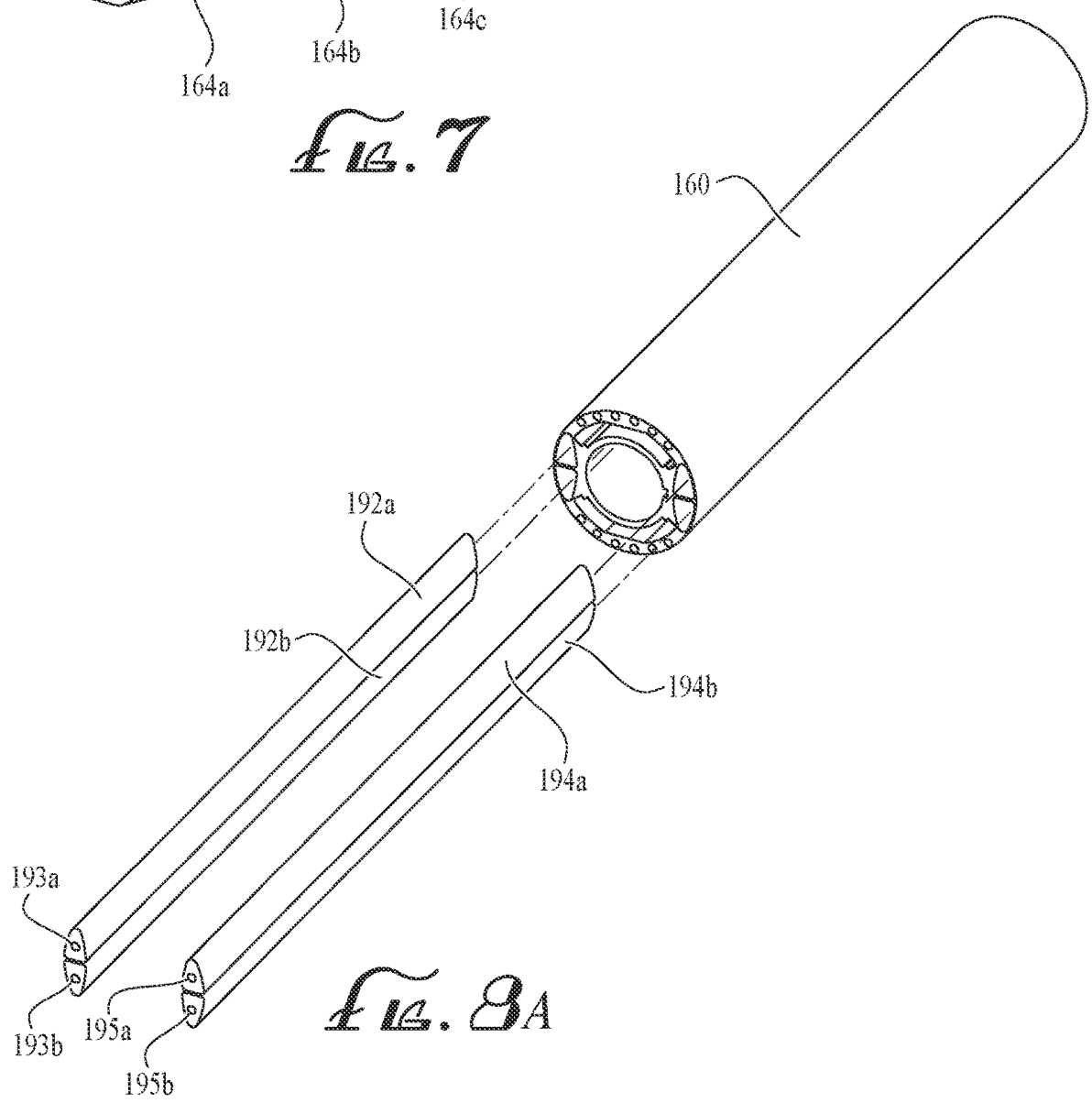
FIG. 8A is an illustration of a plurality of filler structures of a hybrid rotor of a hybrid PMM according to an embodiment of the disclosure.

Turning now to FIG. 8A, a plurality of filler structures that may be inserted into cavities defined in the core 160 are shown. A first filler structure 192a may be inserted into the cavity (the seventh flux barrier) defined by the fifth aperture 186a of the metal laminations 172, a second filler structure 192b may be inserted into the cavity (the eighth flux barrier) defined by the sixth aperture 186b of the metal laminations 172, a third filler structure 194a may be inserted into the cavity (the fifth flux barrier) defined by the third aperture 184a of the metal laminations 172, and a fourth filler structure 194b may be inserted into the cavity (the sixth flux barrier) defined by the fourth aperture 184b of the metal laminations 172. The filler structures 192, 194 comprise non-magnetic, low mass material.

The filler structures 192, 194 may comprise oil resistant material. The filler structures 192, 194 may be non-compressible or substantially non-compressible. The filler structures 192, 194 may be temperature resistant (e.g., able to maintain shape and function in the temperature environments experienced downhole). In an embodiment, the filler structures 192, 194 may comprise aluminum, such as a solid aluminum structure or a hollow aluminum structure. In an embodiment, the filler structures 192, 194 may comprise plastic, for example a plastic that may be extruded in a shape to fit into the flux barriers and cut to length. For example, the filler structures 192, 194 may comprise nylon 6, extruded nylon, cast nylon, of glass-filled nylon. For example, the filler structures 192, 194 may comprise fluoropolymers such as polytetrafluoroethylene (PTFE), filled or unfilled. For example, the filler structures 192, 194 may comprise polyamide-imide. For example, the filler structures 192, 194 may comprise polyether ether ketone (PEEK) material or other like material.

The filler structures 192, 194 may displace volume in the flux barriers to reduce the amount of dielectric oil needed to fill the interior of the hybrid PMM 116, thereby conserving dielectric oil. Dielectric oil may be an oil formulated to provide good electrical insulating properties, to provide good lubrication properties, and to provide good heat transfer properties. Dielectric oil may be selected to be stable at high operating temperatures. In an embodiment, a first open channel 193a is defined in an interior of the first filler structure 192a, a second open channel 193b is defined in an interior of the second filler structure 192b, a third open channel 195a is defined in an interior of the third filler structure 194a, and a fourth open channel 195b is defined in an interior of the fourth filler structure 194b. The open channels 193, 195 may be an open passageway from a first end of the filler structure 192, 194 to a second opposite end of the filler structure 192, 194. The open channels 193, 195 may be drilled through the filler structures 192, 194. The open channels 193, 195 may be molded into the filler structures 192, 194. The open channels 193, 195 may be formed in the filler structures 192, 194 during a casting process of forming the filler structures 192, 194. The open channels 193, 195 may promote improved circulation of dielectric oil within the hybrid PMM 116 and promote uniform temperature distribution within the hybrid PMM 116, thereby avoiding a hot spot that might otherwise cause premature wear or damage in the hybrid PMM 116. Said in other words, the channels 193, 195 are configured to promote flow-through of dielectric oil. In an embodiment, the open channels 193, 195 may define a scoop 242 at the entrance of the channels such that rotation of the rotor 154 urges dielectric oil to flow into the channels, thereby improving circulation of dielectric oil within the hybrid PMM 116 and improving uniform temperature distribution within the hybrid PMM 116. The scoop 242 may be a feature like a ramp or a tip of a screw. In an embodiment, the filler structures 192, 194 may not define open channels.

Figure 8B:
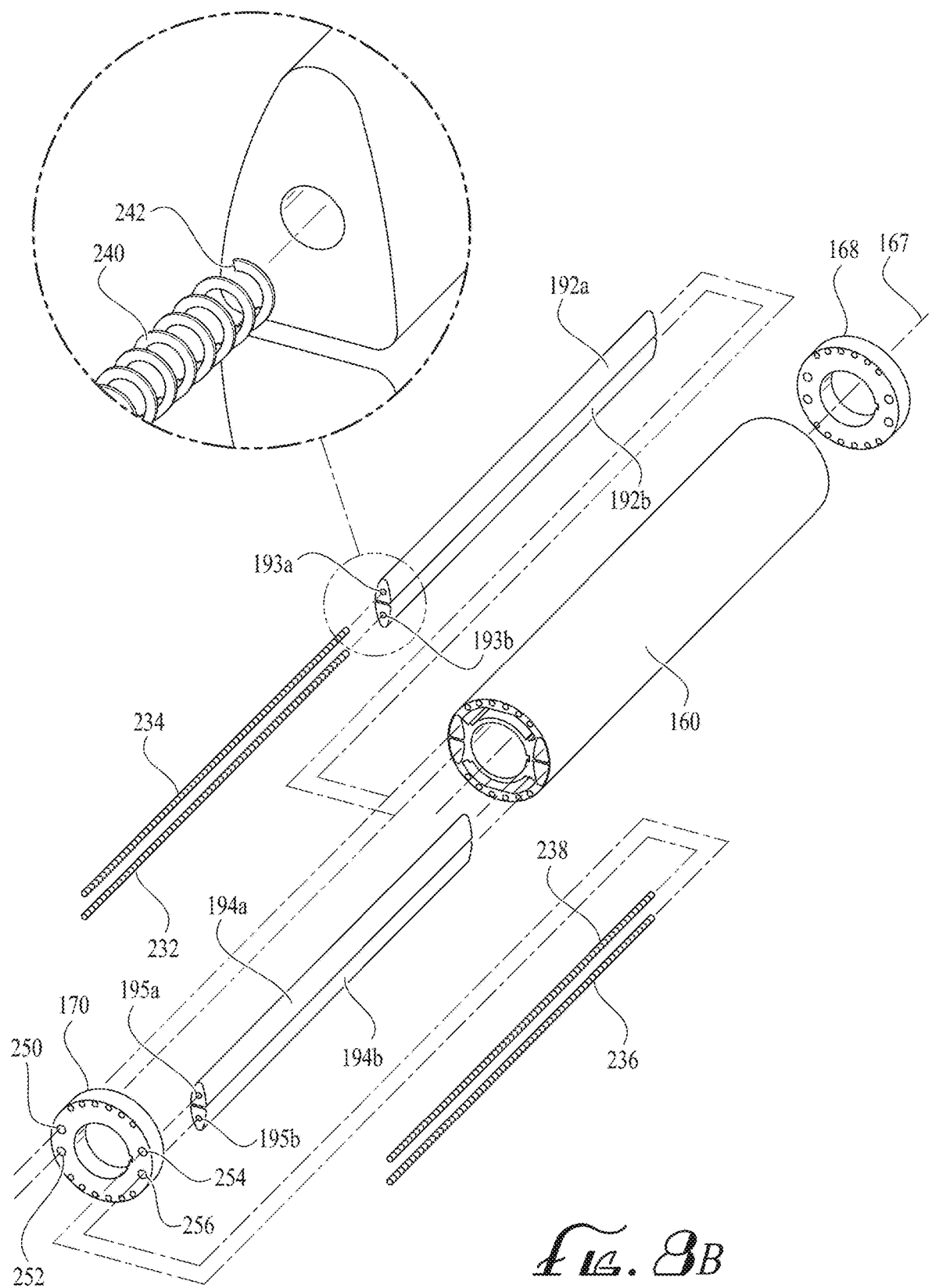
FIG. 8B is an illustration of a plurality of filler structures of a hybrid rotor of a hybrid PMM according to another embodiment of the disclosure.

Turning now to FIG. 8B, further details of the filler structures 192a, 192b, 194a, 194b are described. In an embodiment, fluid movers may be inserted into the openings 250, 252, 254, 256 of the first end ring 168 and into the channels 193a, 193b, 195a, 195b. For example, a first fluid mover 232 may be inserted into the first opening 250 of the first end ring 168 and into the first channel 193a; a second fluid mover 234 may be inserted into the second opening 252 of the first end ring 168 and into the second channel 193b; a third fluid mover 236 may be inserted into the third opening 254 of the first end ring 168 and into the third channel 195a; and a fourth fluid mover 238 may be inserted into the fourth opening 256 of the first end ring 168 and into the fourth channel 195b. When the hybrid rotor 154 rotates, the fluid movers 232, 234, 236, 238 may promote the flow of dielectric oil through the channels 193a, 193b, 195a, 195b whereby heat and temperature flows within the hybrid PMM 116 may be evenly distributed to avoid hot spots. In an embodiment, the fluid movers 232, 234, 236, 238 may be a hollow auger 240 as illustrated in FIG. 8B. The hollow auger 240 may be twisted to reduce its outside diameter for inserting into the openings 250, 252, 254, 256 and into the channels 193a, 193b, 195a, 195b and then released. Upon release of torsional tension, the hollow auger 240 may then increase its outside diameter and effectively set itself into the interior of the openings 250, 252, 254, 256 and into the interior of the channels 193a, 193b, 195a, 195b. A leading edge of the hollow auger 240 (e.g., scoop 242) may be aligned so as to be directed into the rotational direction of the hybrid rotor 154, whereby to scoop in oil and provide motive force for flowing the oil through the channels 193a, 193b, 195a, 195b. In an embodiment, the fluid mover 232, 234, 236, 238 may be an auger affixed to a central shaft (e.g., not a hollow auger but a solid auger).

Figure 9:
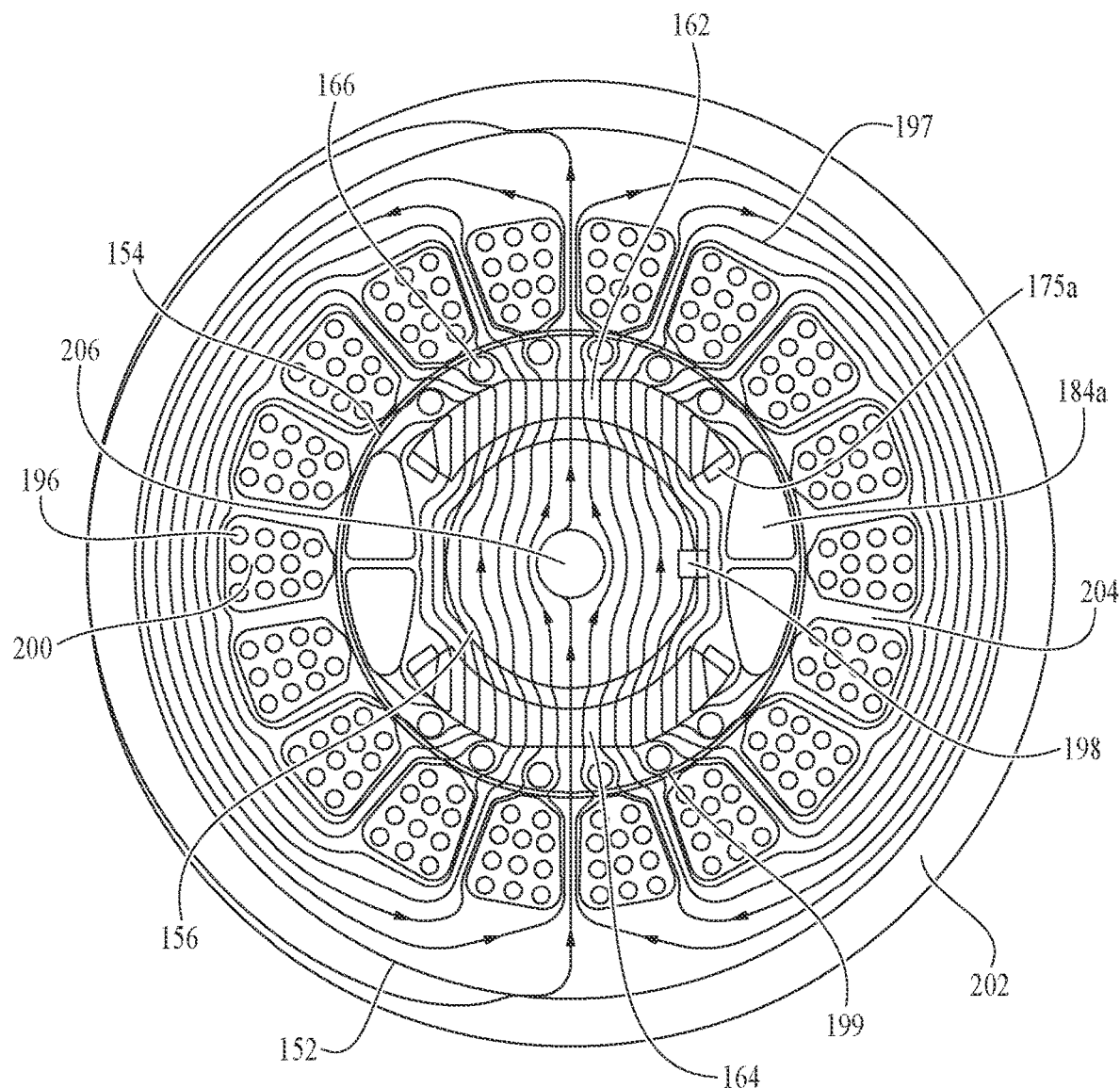
FIG. 9 is an illustration of magnetic flux lines in a cross-section of a hybrid PMM according to an embodiment of the disclosure.

Turning now to FIG. 9, a cross section of the hybrid PMM 116 is illustrated. The core 160 of the rotor 154 is mechanically coupled to the drive shaft 156 by a key 198 inserted into a keyway in the outside surface of the drive shaft 156 and the keyway 182 defined by the metal laminations 172. The stator 152 is retained within the housing 202. The stator 152 comprises a plurality of laminations 204 that define a plurality of apertures 200 that receive stator windings 196. The stator laminations 204 are flat metal sheets defining apertures 200 which may be stamped, milled, or cut in the stator laminations 204. The stator laminations 204 may be made of magnetic metal like the metal laminations 172 of the rotor core. The stator laminations 204 may be coated with insulation material and then cured. There is an air gap 199 between the outside of the core 160 of the rotor 154 and the inside of the stator 152. The air gap 199 is a physical gap between the inside of the stator 154 and the outside of the rotor 152. In an embodiment, the air gap 199 may be in the range of 0.70 mm to 1.30 mm. In another embodiment, the air gap 199 may be in the range of 0.60 mm to 1.40 mm. A conventional induction electric motor air gap may be about 0.5 mm, because it is important for such a motor to have a small airgap to minimize the magnetizing current in the stator windings that induces magnetic flux in its rotor, because this magnetizing current does not contribute to motor torque generation and hence is a source of inefficiency. A conventional induction electric motor has a stator with wire windings and a rotor that does not have permanent magnets and comprises either (a) an induction squirrel cage or (b) a set of wire windings (e.g. a wound rotor). By contrast, PMMs are less sensitive to the size of the air gap relative to conventional induction electric motors, and the hybrid PMM 116 of the present disclosure shares this characteristic. This wider air gap 199 is an advantage to the hybrid PMM 116 because it can further contribute to reducing risks of rotor strikes during operation. While 'air gap' is the conventional term used in the electrical machine art, in some cases the gap is not filed with air but some other substance. In the hybrid PMM 116, the air gap 199 may be filled not with air but with electric motor oil, for example dielectric oil.

Magnetic flux lines 197 are illustrated passing between the rotor 154 and the stator 152, across the air gap 199, looping around stator windings 196, while being largely excluded from the flux barriers 175a, and 184a. The direction of the flux lines 197 is indicated with arrow heads for some of the illustrated flux lines in FIG. 9, but congestion in the illustration does not conduce to putting arrow heads on all the flux lines. While not labeled in FIG. 9, the magnetic flux lines 197 are also excluded from the flux barriers 175b, 177a, 177b, 184b, 186a, and 186b. The magnetic flux lines 197 also tend to be excluded from a channel 206 in the center of the drive shaft 156 that may provide a path for circulation of dielectric oil within the hybrid PMM 116. Some of the magnetic flux lines 197 pass through the drive shaft 156, and the drive shaft 156 is made of magnetic metal, for example made of steel such as 4140 steel or like magnetic steel with strength to transmit torque. It is understood that while some of the magnetic flux produced by the permanent magnet elements 162, 164 passes through the flux barriers 175a, 175b, 177a, 177b, 184a, 184b, 186a, 186b, the ratio of passage of magnetic flux via the flux barriers versus the desired path across the air gap 199 and linking with the stator windings 196 may be considered to be about 1:1000, based on the different relative magnetic permeability of the flux barriers (relative magnetic permeability of about 1.0) and the magnetic metal of the rotor 154, the magnetic metal of the drive shaft 156, and the magnetic metal of the stator 152 (relative magnetic permeability of greater than 1000.0). The magnetic flux lines 197 pass primarily between the stator windings 196, via the metal of laminations in the stator 152, because apertures in the stator 152 that retain the stator windings 196 comprise air, insulation over the stator windings 196, and conductive metal comprising the stator windings 196. The conductive metal comprising the stator windings 196, for example copper or aluminum, may have a relative magnetic permeability of about 1.0.

As used to describe the illustration of magnetic flux lines 197 in FIG. 9, it is understood that magnetic flux may indeed pass through the flux barriers, but at a much attenuated strength level with reference to the metal of the core 160 and the metal of the laminations 200 of the stator 152. For example, the relative magnetic permeability of the flux barriers may be approximately 1.0 while the relative magnetic permeability of the metal laminations 172 of the core 160 of the rotor 154, of the drive shaft 156, and of the metal laminations 200 of the stator 152 may be above 1000. The distribution of magnetic flux lines 197 is managed by placement of magnetic metal components (e.g., regions with relatively very high magnetic permeability) of the hybrid PMM 116 versus placement of flux barriers (e.g., regions with relatively very low magnetic permeability).

Figure 10A:
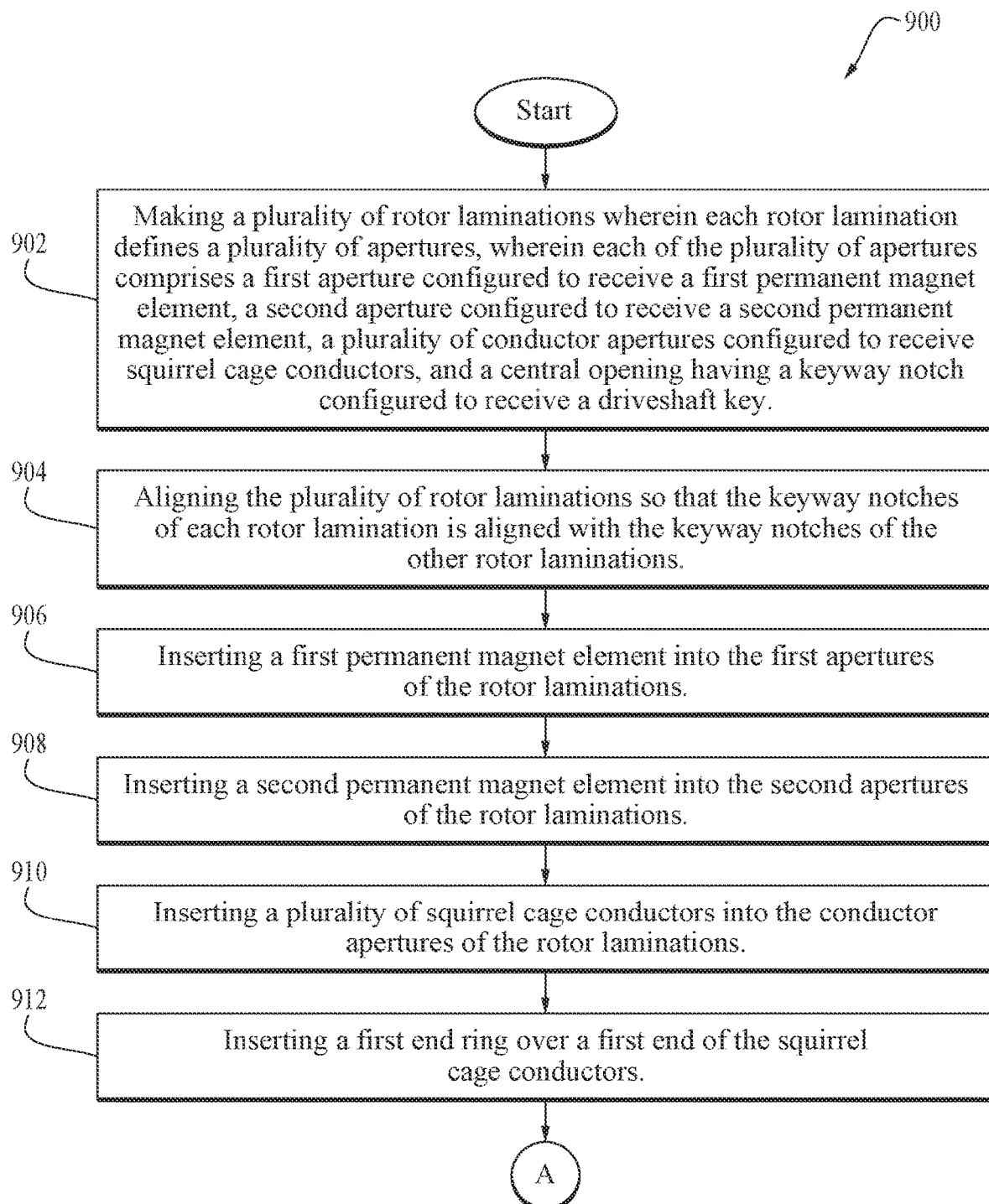
FIG. 10A and FIG. 10B are a flow chart of a method according to an embodiment of the disclosure.
Figure 10B:
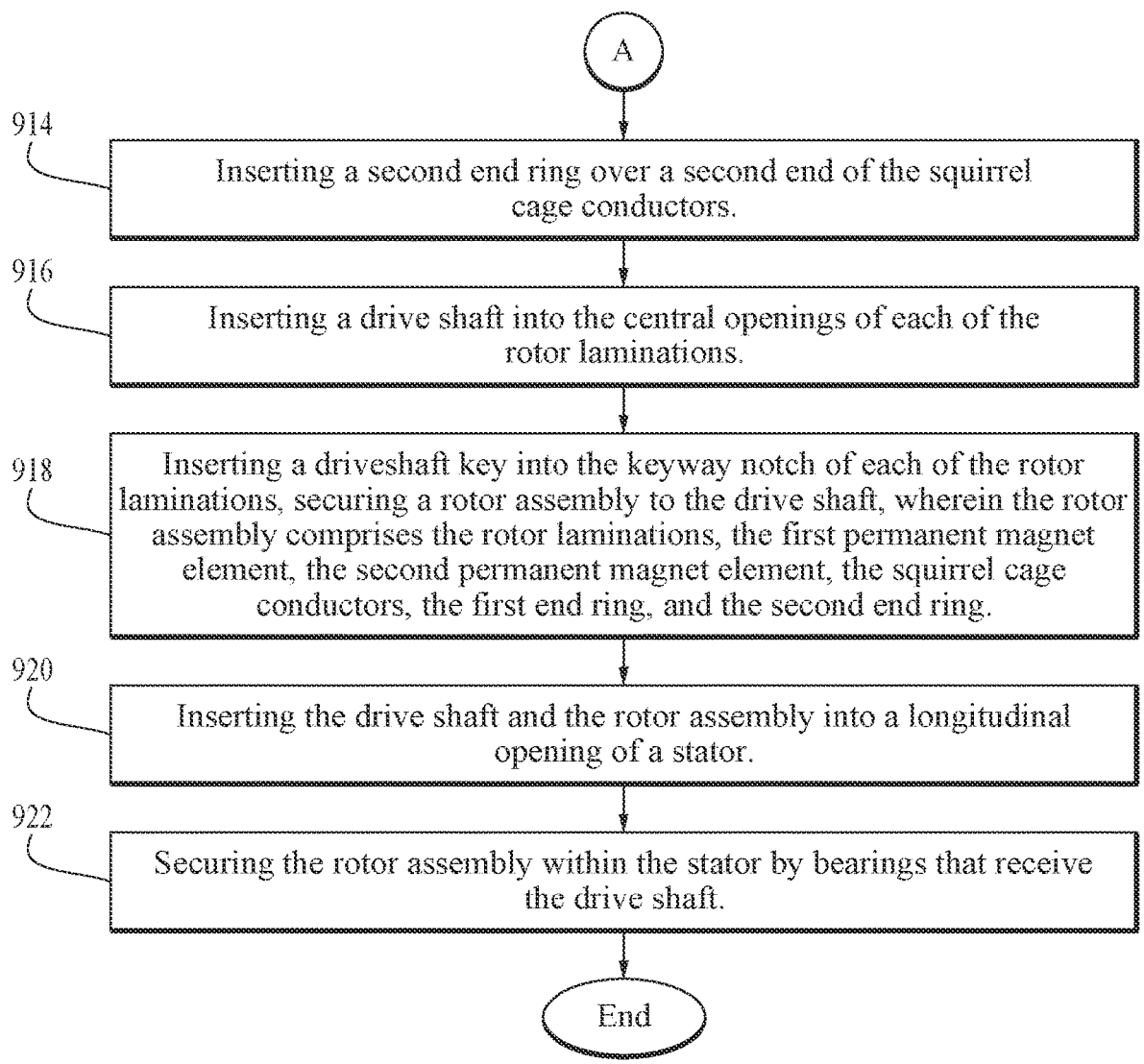

Turning now to FIG. 10A and FIG. 10B, a method 900 is described. In an embodiment, the method 900 is a method of assembling a downhole hybrid permanent magnet motor. At block 902, the method 900 comprises making a plurality of rotor laminations wherein each rotor lamination defines a plurality of apertures, wherein each of the plurality of apertures comprises a first aperture configured to receive a first permanent magnet element, a second aperture configured to receive a second permanent magnet element, a plurality of conductor apertures configured to receive squirrel cage conductors, and a central opening having a keyway notch configured to receive a driveshaft key. In an embodiment, each rotor lamination defines a plurality of apertures that define flux barriers (e.g., flux barriers 184a, 184b, 186a, 186b) located outside of the first aperture, the second aperture, and the plurality of conductor apertures. In an embodiment, the first aperture defines a first flux barrier (e.g., flux barrier 175a) and a second flux barrier (e.g., flux barrier 175b) that do not receive the first permanent magnet element (e.g., the first permanent magnet element, when installed into the first aperture during the processing of block 906 described below, does not protrude into either the first flux barrier or into the second flux barrier) and the second aperture defines a third flux barrier (e.g., flux barrier 177a) and a fourth flux barrier (e.g., flux barrier 177b) that do not receive the second permanent magnet element (e.g., the second permanent magnet element, when installed into the second aperture during the processing of block 908 described below, does not protrude into either the third flux barrier or into the fourth flux barrier). At block 904, the method 900 comprises aligning the plurality of rotor laminations so that the keyway notches of each rotor lamination is aligned with the keyway notches of the other rotor laminations. In another embodiment, however, the method 900 does not comprise the block 902 and 904 and the core of the rotor is a solid core. In this embodiment, the apertures defined by the solid core may be machined into the solid core.

In an embodiment, the method 900 does not comprise block 902 and block 904 comprises aligning a plurality of rotor laminations, wherein each rotor lamination defines a plurality of apertures, wherein each of the plurality of apertures comprises a first aperture configured to receive a first permanent magnet element, a second aperture configured to receive a second permanent magnet element, a plurality of conductor apertures configured to receive squirrel cage conductors, and a central opening having a keyway notch configured to receive a driveshaft key, so that the keyway notches of each rotor lamination is aligned with the keyway notches of the other rotor laminations. The method 900 may not comprise block 902, for example, when the rotor laminations are purchased by an original equipment manufacturer (OEM) of hybrid permanent magnet motors from a third party. In that case, the making of laminations is not performed by the OEM but instead by the third party.

At block 906, the method 900 comprises inserting a first permanent magnet element into the first apertures of the rotor laminations or the solid rotor core. At block 908, the method 900 comprises inserting a second permanent magnet element into the second apertures of the rotor laminations or the solid rotor core. In an embodiment, inserting the first permanent magnet element comprises inserting a first plurality of magnet segments into the first apertures of the rotor laminations or the solid rotor core and inserting the second permanent magnet element comprises inserting a second plurality of magnet segments into the second apertures of the rotor laminations or the solid rotor core while staggering the second plurality of magnet segments relative to the first plurality of magnet segments. In an embodiment, the method 900 comprises installing a filler structure into each of the plurality of apertures that define flux barriers (e.g., flux barriers 184a, 184b, 186a, 186b).

At block 910, the method 900 comprises inserting a plurality of squirrel cage conductors into the conductor apertures of the rotor laminations or solid rotor core. At block 912, the method 900 comprises installing a first end ring over a first end of the squirrel cage conductors. In an embodiment, the processing of block 912 comprises electrically connecting the squirrel cage conductors to the first end ring, for example by soldering or braising the first end ring to a first set of ends of the squirrel cage conductors. At block 914, the method 900 comprises installing a second end ring over a second end of the squirrel cage conductors. In an embodiment, the processing of block 914 comprises electrically connecting the squirrel cage conductors to the second end ring, for example by soldering or braising the second end ring to a second set of ends of the squirrel cage conductors, where the second end of each squirrel cage conductor is at an opposite end from the first end of the squirrel cage conductor.

At block 916, the method 900 comprises inserting a drive shaft into the central openings of each of the rotor laminations or the solid rotor core. At block 918, the method 900 comprises inserting a driveshaft key into the keyway notch of each of the rotor laminations or solid rotor core, thereby securing a rotor assembly to the drive shaft, wherein the rotor assembly comprises the rotor laminations or the solid rotor core, the first permanent magnet element, the second permanent magnet element, the squirrel cage conductors, the first end ring, and the second end ring.

In an embodiment, the rotor 154 comprises a plurality of rotor modules, wherein each rotor module comprises the core 160, the permanent magnet elements 162, 164, the squirrel cage conductors 166, and the end rings 168, 170. Each of these rotor modules may be assembled onto the drive shaft 156 with bearings placed on the drive shaft 156 between each of the rotor modules and at both outside ends of the outer rotor modules. In an embodiment, each of the blocks 904 through 918 may be performed for each of the rotor modules.

At block 920, the method 900 comprises inserting the drive shaft and the rotor assembly into a longitudinal opening of a stator. The longitudinal opening of the stator is the elongated, central opening of the stator. A central axis of the stator passes through the center of this longitudinal opening. In an embodiment, the method 900 comprises, before performing the action of inserting the drive shaft and the rotor assembly into the longitudinal opening of the stator, removing a conventional induction motor rotor assembly from the longitudinal opening of the stator. For example, this may be performed when a previously built conventional electric motor (e.g., an ESP electric motor with a conventional induction rotor assembly lacking permanent magnets) is to be retrofitted with the hybrid rotor described herein. A conventional induction rotor assembly lacks permanent magnets and comprises (a) an induction squirrel cage or (b) a set of windings (e.g., a wound rotor). At block 922, the method 900 comprises securing the rotor assembly within the stator by bearings that receive the drive shaft. In another embodiment, however, the method 900 does not comprise the processing of block 922.

Figure 11:
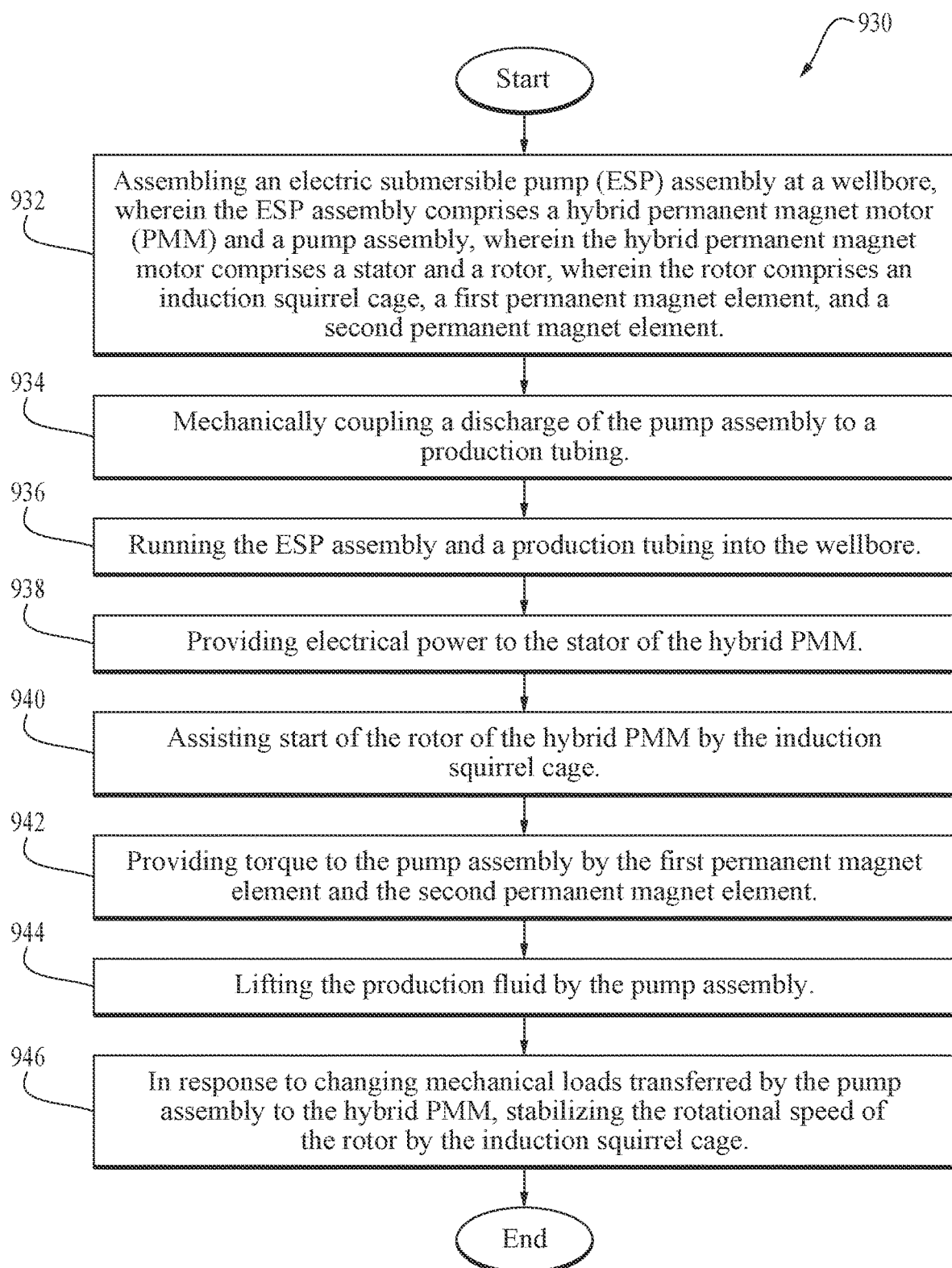
FIG. 11 is a flow chart of another method according to an embodiment of the disclosure.

Turning now to FIG. 11, a method 930 is described. In an embodiment, the method 930 is a method of lifting production fluid in a wellbore. The production fluid may comprise fluids carrying hydrocarbons, for example carrying crude oil and/or natural gas. The production fluid may comprise hot water or other geothermal fluid. At block 932, the method 930 comprises assembling an electric submersible pump (ESP) assembly at a wellbore, wherein the ESP assembly comprises a hybrid permanent magnet motor (PMM) and a pump assembly, wherein the hybrid permanent magnet motor comprises a stator and a rotor, wherein the rotor comprises an induction squirrel cage, a first permanent magnet element, and a second permanent magnet element (e.g., the hybrid rotor 154 described above). The ESP assembly may further comprise a seal section located between the hybrid PMM and the pump assembly. The ESP assembly may further comprise a gas separator located between the seal section and the pump assembly. In an embodiment, the pump assembly is part of an integral gas separator and pump assembly.

At block 934, the method 930 comprises mechanically coupling a discharge of the pump assembly to a production tubing. At block 936, the method 930 comprises running the ESP assembly and production tubing into the wellbore. A block 938, the method 930 comprises providing electrical power to the stator of the hybrid PMM. The processing of block 938 may comprise providing voltage and current at a particular frequency (e.g., 60 Hz) via the electric cable 110 to the hybrid PMM 116. The processing of block 938 may comprise providing three-phase alternating current and voltage at a particular frequency to the hybrid PMM 116. The processing of block 938 may comprise providing voltage and current at a varying frequency to the hybrid PMM 116.

At block 940, the method 930 comprises assisting start of the rotor of the hybrid PMM by the induction squirrel cage. For example, as the hybrid rotor 154 of the hybrid PMM 116 is accelerating to achieve a synchronous angular speed dependent on the frequency of the electrical power supplied to the stator 152 by the motor controller 120, currents may be induced in the squirrel cage conductors 166 of the hybrid rotor 154, this induced current in the squirrel cage conductors 166 may establish a magnetic flux that interacts with magnetic flux generated by the currents in the stator 152 of the hybrid PMM 116, and this interaction may produce torque in the rotor 154 that complements the torque produced in the hybrid rotor 154 by the interaction of the magnetic flux generated by the currents in the stator 152 and the magnetic flux produced by the permanent magnet elements 162, 164. At block 942, the method 930 comprises providing torque to the pump assembly by the first permanent magnet element and the second permanent magnet element, for example by providing torque to a drive shaft of the seal section 114, and the drive shaft of the seal section 114 providing torque to the drive shaft of the pump assembly 108.

At block 944, the method 930 comprises lifting the production fluid by the pump assembly, for example lifting the production fluid up the production tubing to the surface. At block 946, the method 930 comprises, in response to changing mechanical loads transferred by the pump assembly to the hybrid PMM, stabilizing the rotational speed of the rotor by the induction squirrel cage. Stabilizing the rotational speed of the rotor by the induction squirrel cage can include increasing (e.g., accelerating) the rotational speed of the rotor when the rotational speed has slowed down below synchronous speed and can include decreasing (e.g., decelerating or braking) the rotational speed of the rotor when the rotational speed has increased above synchronous speed. Synchronous speed is that speed at which the rotational speed of the rotor is synchronized with the speed of the rotating fields in the windings of the stator of the hybrid PMM.

In an embodiment, the method 930 further comprises prompting magnetic flux produced by the first permanent magnet element to flow via the stator and from the stator to the second permanent magnet by barriers (e.g., flux barriers 175a, 175b, 177a, 177b) defined by magnet pockets defined by a plurality of laminations of the rotor, wherein a first magnet pocket receives the first permanent magnet element and a second magnet pocket receives the second permanent magnet element. In an embodiment, the magnetic flux produced by the first permanent magnet element is prompted to flow via the stator and from the stator to the second permanent magnet additionally by flux barriers defined by aligned apertures defined by the laminations of the rotor. Said in other words, the flux barriers tend to exclude passage of magnetic flux due to their low magnetic permeability relative to the high magnetic permeability of the magnetic metal in the hybrid rotor laminations, the magnetic metal in the stator laminations, and the magnetic metal in the drive shaft.

In an embodiment, the method 930 further comprises retrofitting a hybrid rotor into a rotor of a conventional ESP electric motor to form a hybrid PMM as described above with reference to FIG. 2 through FIG. 9. For example, retrofitting may comprise removing a conventional rotor from a conventional ESP electric motor, inserting the hybrid rotor described above into the conventional rotor, and securing the hybrid rotor within the conventional rotor. The process of retrofitting may comprise the processing of at least some of the method 900 described above with reference to FIG. 10A and FIG. 10B, for example to assemble the hybrid rotor before inserting it into the conventional rotor.

Figure 12A:
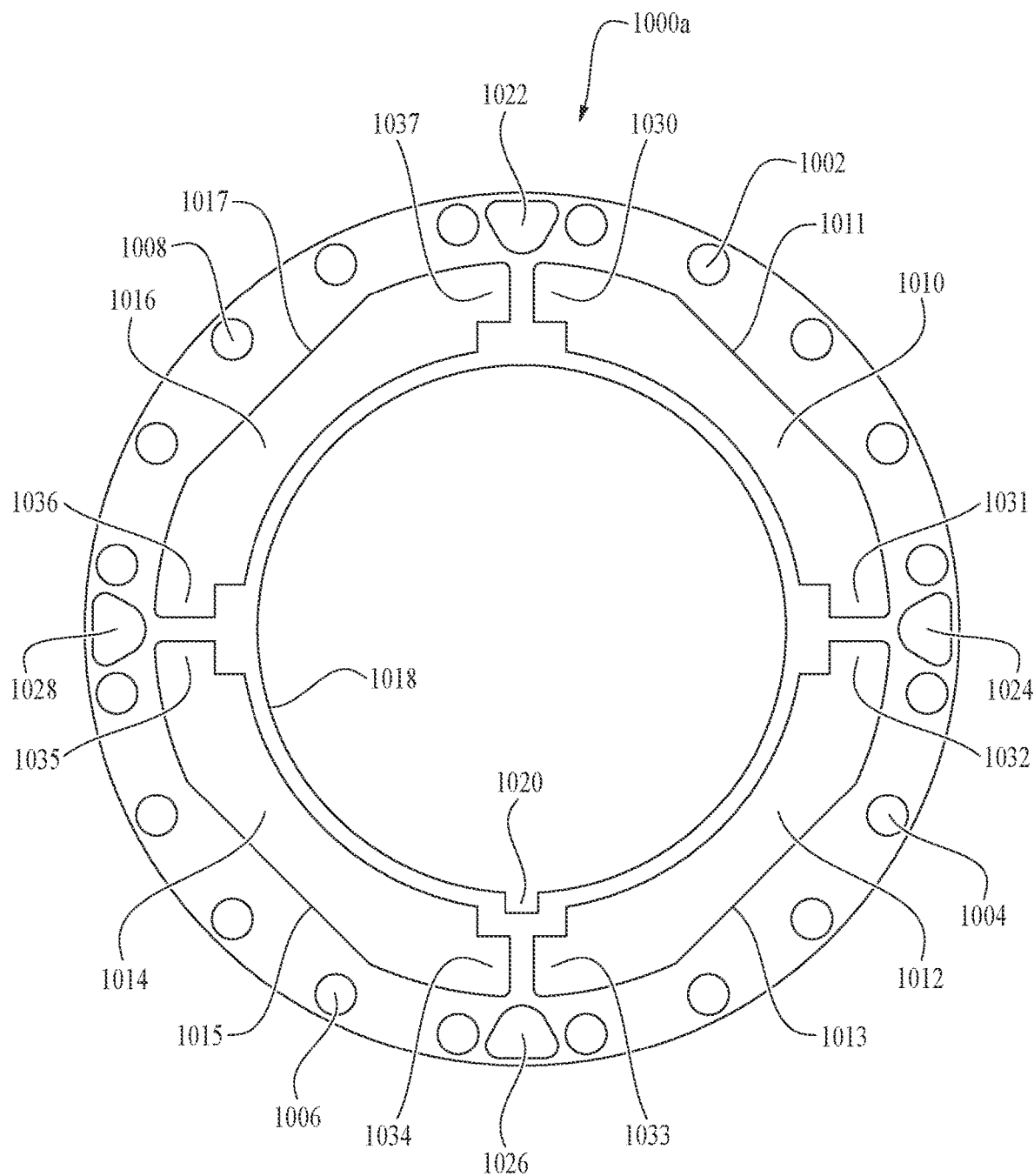
FIG. 12A is an illustration of a lamination of a hybrid rotor of a hybrid PMM according to another embodiment of the disclosure.

Turning now to FIG. 12A, a lamination 1000a for use with a four-pole hybrid rotor is described. In an embodiment, the lamination 1000a is substantially similar to the lamination 172 described above with reference to FIG. 4, with the distinction that the lamination 1000a is for use in assembling a rotor core 160 for a four-pole hybrid PMM 116 while the lamination 172 was for use in assembling a rotor core 160 for a two-pole hybrid PMM 116. The lamination 1000a may be made of any magnetic material as described above with reference to FIG. 4. The lamination 1000a may be coated with insulation material and then cured.

The lamination 1000a is provided with a plurality of apertures, whereby to define cavities in the core 160 when a plurality of laminations 1000a are aligned to form the core 160. The laminations 1000a and the apertures may be stamped from sheets of magnetic metal. In an embodiment, both stator laminations for forming a stator core and laminations 1000a may be stamped in a single process from the same sheet or sheets of magnetic metal. In an embodiment, the lamination 1000a defines a first aperture 1010, a second aperture 1012, a third aperture 1014, and a fourth aperture 1016. The first aperture 1010 may receive a first permanent magnet element, the second aperture 1012 may receive a second permanent magnet element, the third aperture 1014 may receive a third permanent magnet element, and the fourth aperture 1016 may receive a fourth permanent magnet element. These permanent magnet elements may be substantially similar to the permanent magnet elements 162, 164 described above with reference to FIG. 3, FIG. 6A, FIG. 6C, and FIG. 7. The permanent magnet elements for use with the lamination 1000a may be cropped permanent magnets.

The first aperture 1010 defines a first integral flux barrier 1030 and a second integral flux barrier 1031; the second aperture 1012 defines a third integral flux barrier 1032 and a fourth integral flux barrier 1033; the third aperture 1014 defines a fifth integral flux barrier 1034 and a sixth integral flux barrier 1035; and the fourth aperture 1016 defines a seventh integral flux barrier 1036 and an eighth integral flux barrier 1037. The integral flux barriers 1030-1037 provide the same function as the flux barriers 175a, 175b, 177a, 177b described above with reference to FIG. 4.

The lamination 1000a further defines a plurality of conductor apertures 1002, 1004, 1006, 1008 for receiving induction squirrel cage conductors 166 as illustrated in FIG. 3. The lamination 1000a further defines a plurality of flux barrier apertures 1022, 1024, 1026, 1028 for providing flux barriers having the same function as the flux barriers 184a, 184b, 186a, 186b described above with reference to FIG. 4. The lamination 1000a defines a central aperture 180 for receiving the drive shaft 156. The lamination 1000a defines a keyway 1020 to align with a corresponding keyway in the drive shaft 156 to accept a key to mechanically couple the core 160 and the rotor 154 to the drive shaft 156.

Figure 12B:
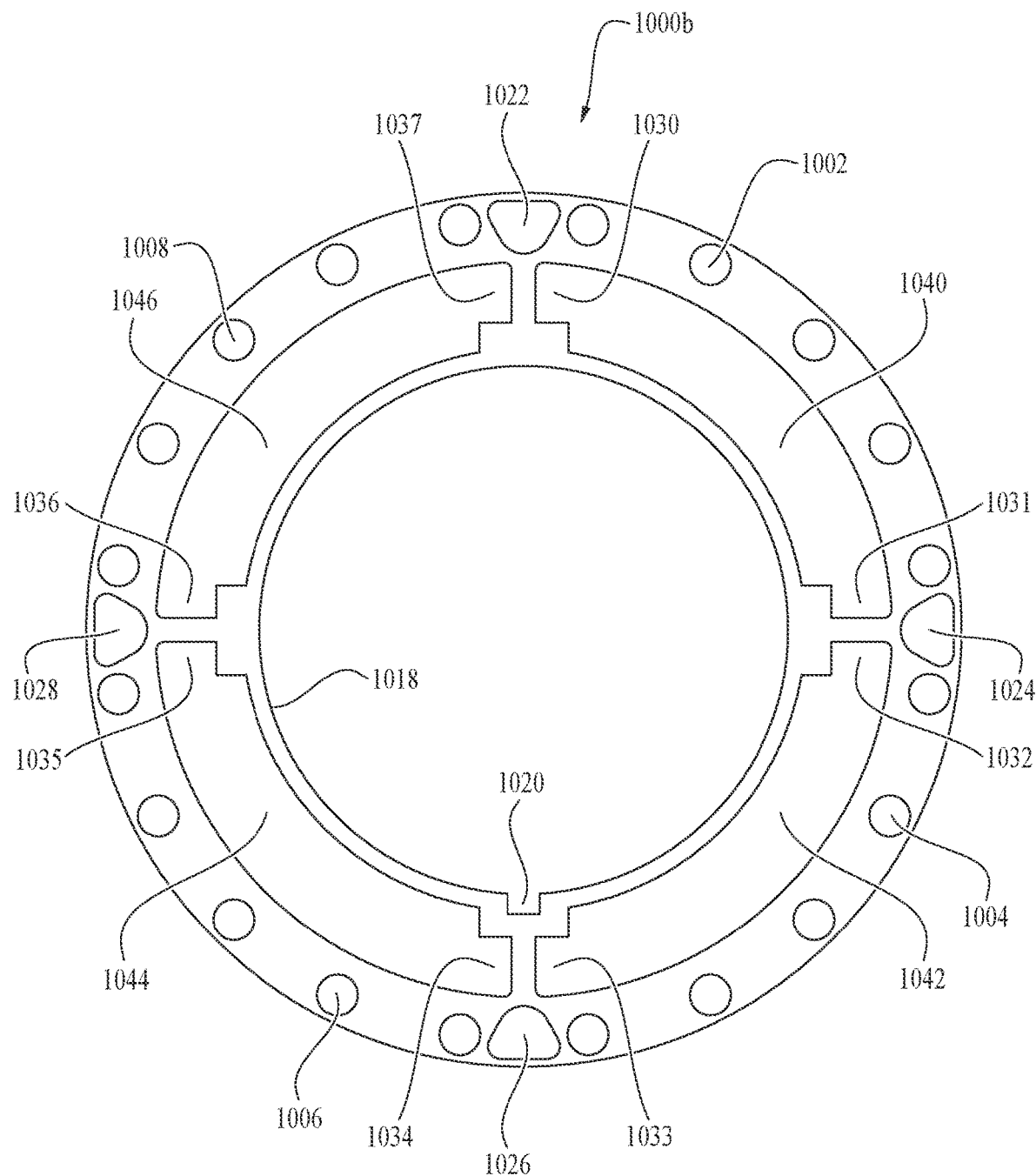
FIG. 12B is an illustration of a lamination of a hybrid rotor of a hybrid PMM according to yet another embodiment of the disclosure.

Turning now to FIG. 12B, a lamination 1000b for use with another four-pole hybrid rotor is described. The lamination 1000b is substantially similar to the lamination 1000a, with the distinction that the apertures for receiving permanent magnet elements are configured for receiving uncropped permanent magnet elements. The lamination 1000b defines a fifth aperture 1040 for receiving an uncropped permanent magnet element, a sixth aperture 1042 for receiving an uncropped permanent magnet element, a seventh aperture 1044 for receiving an uncropped permanent magnet element, and an eight aperture 1046 for receiving an uncropped permanent magnet element.

Figure 13A:
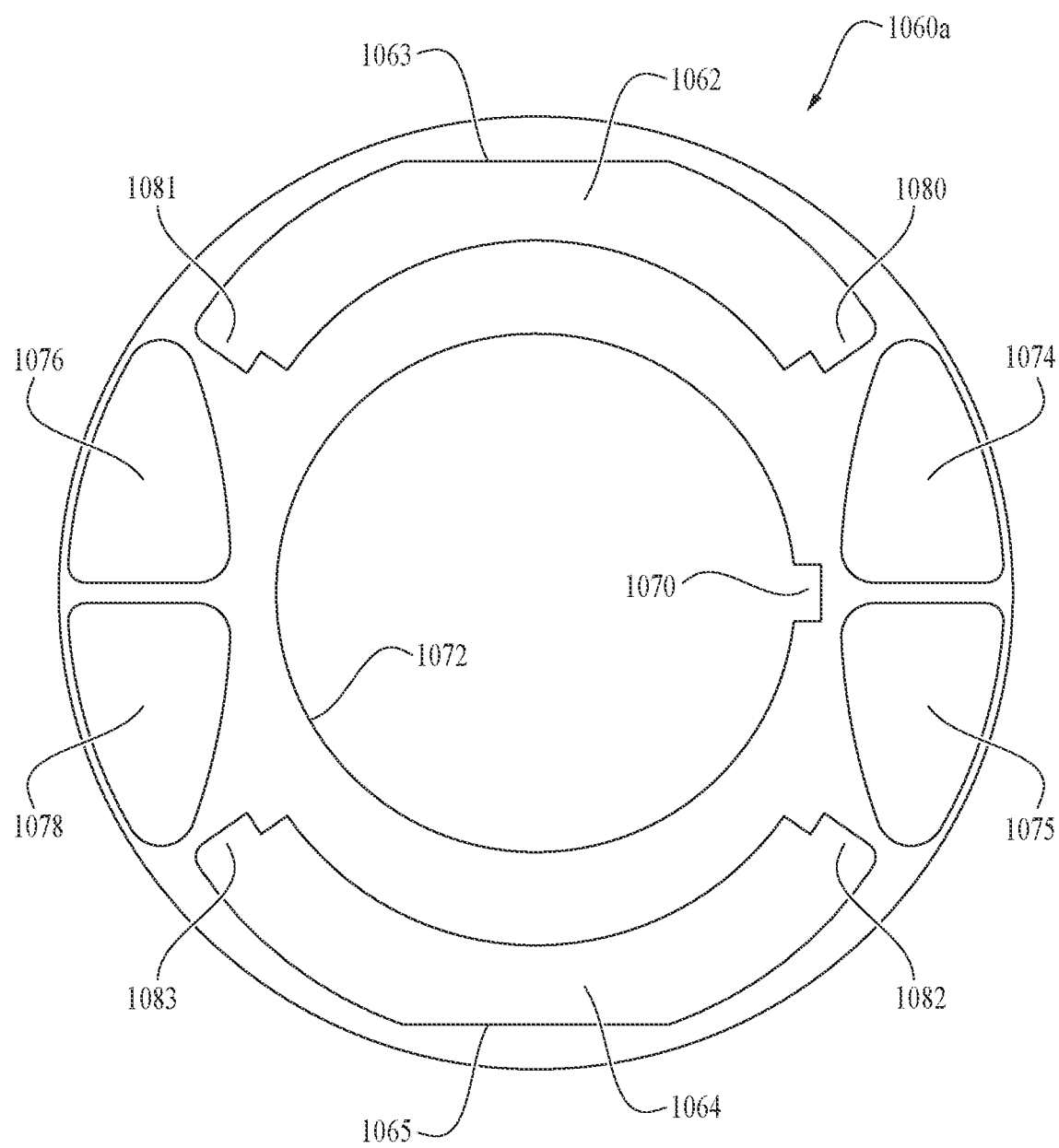
FIG. 13A is an illustration of a lamination of a rotor of a PMM according to an embodiment of the disclosure.

Turning now to FIG. 13A, a lamination 1060a for use with a PMM rotor is described. Many of the novel features described above with reference to a hybrid PMM rotor may be advantageously applied to the construction of a PMM rotor that does not comprise an inductive squirrel cage. For example, the use of magnet pockets to contain the permanent magnet elements within the core 160 rather than on a surface of the rotor can be applied to advantage in construction of a PMM rotor. For example, the use of flux barriers—both flux barriers integral to the apertures that define the magnet pockets and the flux barriers between the magnet pockets—can be applied to advantage in construction of a PMM rotor to make the PMM rotor and PMM electric motor more efficient. For example, the use of filler structures in the flux barriers between magnet pockets can be applied to advantage in construction of a PMM rotor to conserve dielectric oil in the PMM motor. For example, the filler structures may have channels that promote circulation of dielectric oil within the PMM to promote uniform temperature distribution within the PMM.

The lamination 1060a is configured for use with a two-pole PMM rotor, but it will be appreciated that the design could readily be adapted to provide a four-pole PMM rotor, a six-pole PMM rotor, a twelve-pole PMM rotor, or a PMM rotor for a different number of poles. In an embodiment, the lamination 1060a is substantially similar to the lamination 172 described relative to FIG. 4 above, with the difference that there are no apertures in the lamination 1060a for squirrel cage conductors 166. The lamination 1060a may be used to assemble a rotor core for a PMM rotor. The lamination 1060a may be made of any magnetic material as described above with reference to FIG. 4 and lamination 172. The lamination 1060a may be coated with insulation material and then cured. The lamination 1060a is provided with a plurality of apertures, whereby to define cavities in a PMM rotor core when a plurality of laminations 1060a are aligned to form the core. The laminations 1060a may be stamped from sheets of magnetic metal. In an embodiment, both stator laminations and laminations 1060a may be stamped in a single process from the same sheet or sheets of magnetic metal.

The lamination 1060a defines a first aperture 1062 and a second aperture 1064. The first aperture 1062 may receive a first cropped permanent magnet element, and the second aperture 1064 may receive a second cropped permanent magnet element. The first aperture has a flattened portion 1063 to accommodate the cropping of the first cropped permanent magnet element; the second aperture 1064 has a flattened portion 1065 to accommodate the cropping of the second cropped permanent magnet element. These permanent magnet elements may be substantially similar to the permanent magnet elements 162, 164 described above with reference to FIG. 3, FIG. 6A, FIG. 6C, and FIG. 7.

The first aperture 1062 defines a first integral flux barrier 1080 and a second integral flux barrier 1081 which provide the same functions as the flux barriers 175a, 175b described above with reference to FIG. 4. The second aperture 1064 defines a third integral flux barrier 1082 and a fourth integral flux barrier 1083 which provide the same functions as the flux barriers 177a, 177b described above with reference to FIG. 4. The lamination 1060a further defines a flux barriers 1074, 1075, 1076, 1078 having the same function as the flux barriers 184a, 1884b, 186a, 186b described above with reference to FIG. 4. The lamination 1060a further defines a central aperture 1072 for receiving the drive shaft 156. The lamination 1060a defines a keyway 1070 to align with a corresponding keyway in the drive shaft 156 to accept a key to mechanically couple the core 160 to the PMM rotor to the drive shaft 156.

Figure 13B:
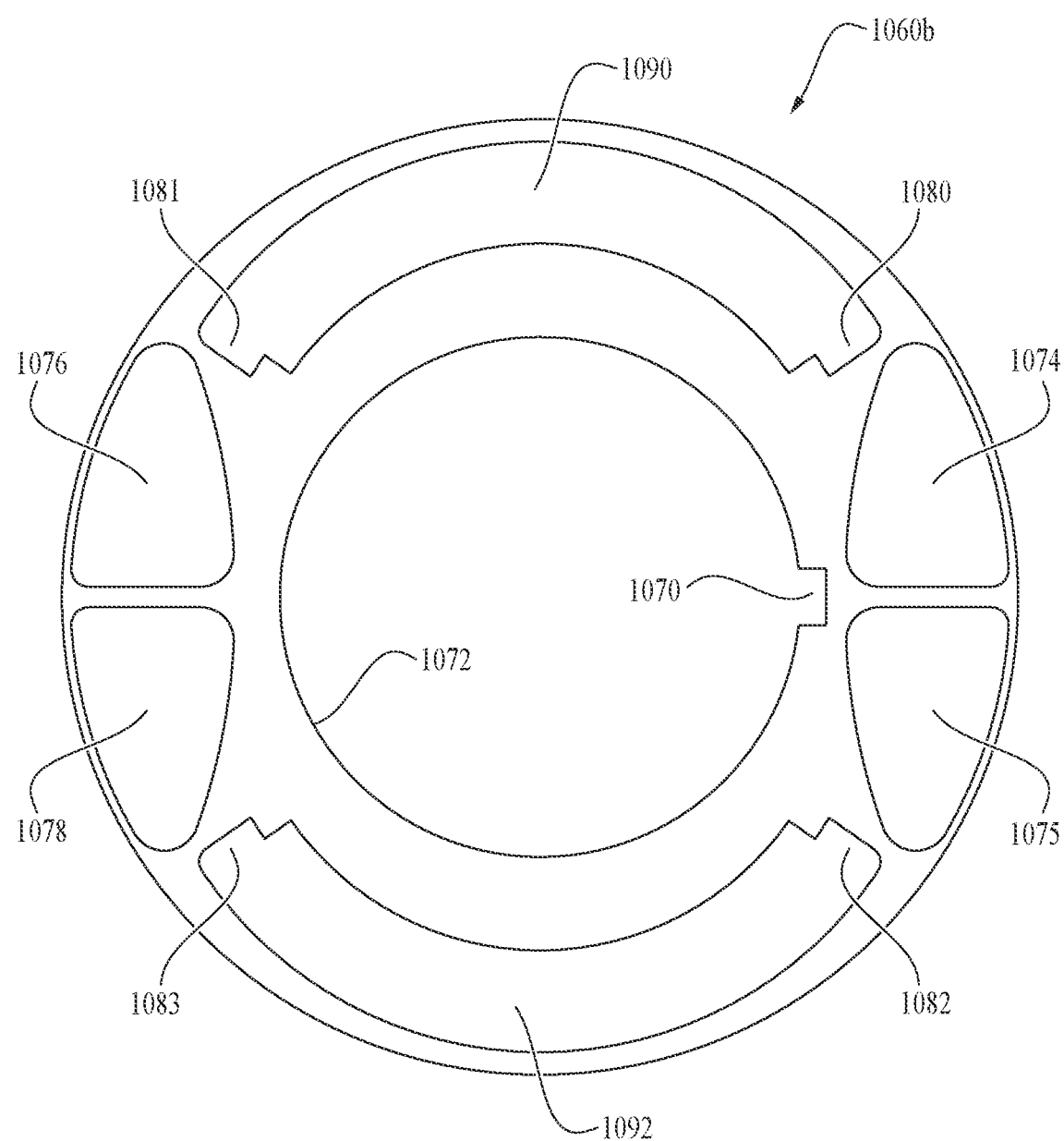
FIG. 13B is an illustration of a lamination of a rotor or a PMM according to another embodiment of the disclosure.

Turning now to FIG. 13B, a lamination 1060b for use with a PMM rotor is described. The lamination 1060b is substantially similar to the lamination 1060a described above with reference to FIG. 13A, with the difference that the lamination 1060b provides a first aperture 1090 and a second aperture 1092 suitable for receiving uncropped permanent magnet elements.

Turning now to FIG. 14, an assembly of a PMM 1100 is described. The assembly of the PMM 1100 is substantially similar to the assembly of the hybrid PMM 116 described above with reference to FIG. 2 and other figures, with the difference that the core 1102 does not receive squirrel cage conductors 166 as illustrated in FIG. 3. A core 1102 may be a solid core or may be formed with a plurality of rotor laminations, such as laminations 1060b. A first permanent magnet element 1104 may be inserted into a first magnetic pocket in the core 1102 defined by the alignment of the apertures 1090, and a second permanent magnet element 1106 may be inserted into a second magnetic pocket in the core 1102 defined by the alignment of the apertures 1092. The permanent magnet elements 1104, 1106 may be substantially similar to the permanent magnet elements 162, 164 described above with reference to FIG. 3, FIG. 6A, FIG. 6B, and FIG. 7, with the difference that the dimensions of the permanent magnet elements may differ somewhat due to the different dimensions of the magnet pockets due to the absence of squirrel cage conductors in the PMM 1100.

While the permanent magnet elements 1104, 1106 illustrated in FIG. 14 are uncropped, it is understood that in an alternative embodiment, the PMM 1100 may be built with cropped permanent magnet elements inserted into a core 1102 that is either a solid core or is formed of a plurality of laminations such as 1060*a*. The permanent magnet elements 1104, 1106 may be retained within the core 1102 by a first cap 1108 and a second cap 1110. While the PMM 1100 illustrated in FIG. 14 shows only one rotor assembled onto the drive shaft 156, it is understood that the PMM 1100 may be formed of two rotor modules, three rotor modules, four rotor modules, or some other plurality of rotor modules, where each rotor module is like the rotor assembly (core 1102, permanent magnet elements 1104, 1106, and caps 1108, 1110).

In an embodiment, the PMM 1100 may comprise filler structures inserted into the flux barriers 1074, 1075, 1076, 1078 substantially similar to the filler structures 192*a*, 192*b*, 194*a*, 194*b* described above with reference to FIG. 8A and FIG. 8B. In an embodiment, the filler structures inserted into the flux barriers 1074, 1075, 1076, 1078 may define channels that promote circulating flow of dielectric oil within the PMM 1100. For example, in an embodiment, the filler structures inserted into the flux barriers 1074, 1075, 1076, 1078 may have fluid movers 240 inserted into their channels to promote flow of dielectric oil through the channels with the PMM rotor is rotating.

Figure 15:
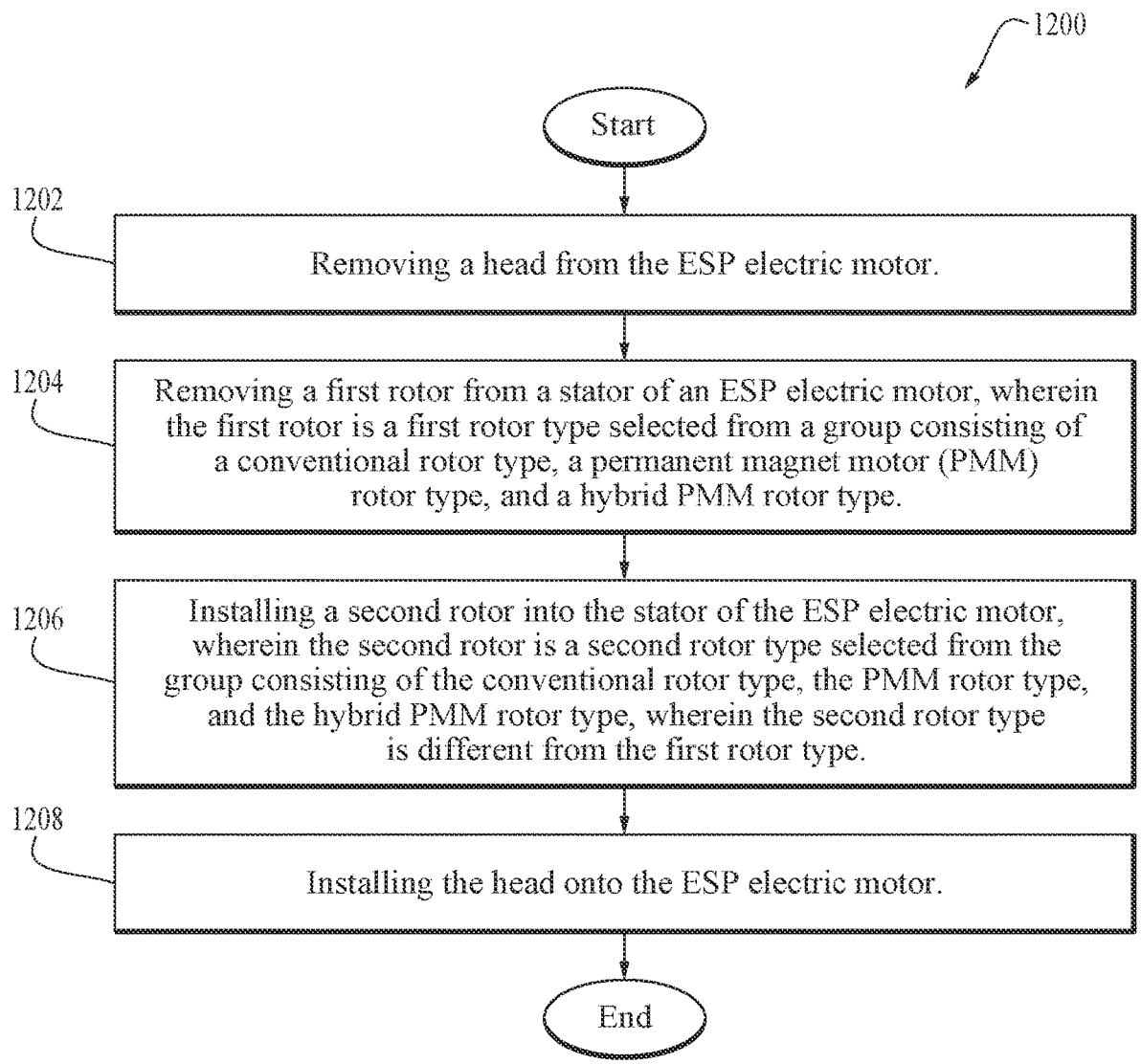
FIG. 15 is a flow chart of yet another method according to an embodiment of the disclosure.

Turning now to FIG. 15, a method 1200 is described. In an embodiment, the method 1200 is a method of retrofitting a different type of rotor into an electric submersible pump (ESP) electric motor. At block 1202, the method 1200 comprises removing a head from the ESP electric motor. For example, block 1202 may comprise removing the head 157 from the housing 202 of the hybrid PMM 116. For example, block 1202 may comprise removing the head 157 from the housing 202 of the PMM 1100. For example, block 1202 may comprise removing a head of a conventional induction motor.

At block 1204, the method 1200 comprises removing a first rotor from a stator of an ESP electric motor, wherein the first rotor is a first rotor type selected from a group consisting of a conventional induction rotor type, a permanent magnet motor (PMM) rotor type, and a hybrid PMM rotor type. At block 1206, the method 1200 comprises installing a second rotor into the stator of the ESP electric motor, wherein the second rotor is a second rotor type selected from the group consisting of the conventional induction rotor type, the PMM rotor type, and the hybrid PMM rotor type, wherein the second rotor type is different from the first rotor type. At block 1208, the method 1200 comprises installing the head onto the ESP electric motor.

The processing of block 1204 and 1206 may entail any single one of (A) removing a first rotor of a conventional induction rotor type from the stator of the ESP electric motor and installing a second rotor of a hybrid PMM rotor type into the stator of the ESP electric motor; (B) removing a first rotor of a PMM rotor type from the stator of the ESP electric motor and installing a second rotor of a hybrid PMM rotor type into the stator of the ESP electric motor; (D) removing a first rotor of a conventional induction rotor type from the stator of the ESP electric motor and installing a second rotor of a PMM rotor type into the stator of the ESP electric motor; (D) removing a first rotor of a hybrid PMM rotor type from the stator of the ESP electric motor and installing a second rotor of PMM rotor type into the stator of the ESP electric motor; (E) removing a first rotor of a hybrid PMM rotor type from the stator of the ESP electric motor and installing a second rotor of a conventional induction rotor type into the ESP electric motor; and (F) removing a first rotor of a PMM rotor type from the stator of the ESP electric motor and installing a second rotor of a conventional induction rotor type into the ESP electric motor.

In an embodiment, the removal of the first rotor may comprise removing the drive shaft 156 with one or more rotor modules assembled onto the drive shaft 156 from the stator of the ESP electric motor. In an embodiment, the installation of the second rotor may comprise installing the drive shaft 156 with one or more rotor modules assembled onto the drive shaft 156 into the stator of the ESP electric motor.

In an embodiment, the rotor types are selected from the group consisting of a conventional induction rotor type, a permanent magnet motor (PMM) rotor type (e.g., having permanent magnet elements retained within apertures in the core as described above with reference to FIG. 13A and FIG. 13B), a hybrid PMM rotor type, and an externally affixed PMM rotor type (e.g., where permanent magnets are attached or affixed to an outside of the core of the rotor). In an embodiment, the processing of block 1204 comprises removing a first rotor from the stator of the ESP electric motor, wherein the first rotor is an externally affixed PMM rotor type, and the processing of block 1204 comprises installing a second rotor into the stator of the ESP electric motor, wherein the second rotor is a PMM rotor type.

Turning now to FIG. 16, a method 1220 is described. In an embodiment, the method 1220 is a method of assembling a downhole permanent magnet motor (PMM), for example the PMM 1100 described above with reference to FIG. 13A, FIG. 13B, and/or FIG. 14. At block 1222, the method 1220 comprises making a plurality of rotor laminations wherein each rotor lamination defines a plurality of apertures, wherein each of the plurality of apertures comprises a first aperture configured to receive a first permanent magnet element, a second aperture configured to receive a second permanent magnet element, and a central opening having a keyway notch configured to receive a driveshaft key. In an embodiment, the first aperture defines a first flux barrier and a second flux barrier that do not receive the first permanent magnet element and wherein the second aperture defines a third flux barrier and a fourth flux barrier that do not receive the second permanent magnet element. In an embodiment, each rotor lamination or the solid core defines a plurality of flux barrier apertures located outside of the first aperture, the second aperture, and the plurality of conductor apertures.

At block 1224, the method 1220 comprises aligning the plurality of rotor laminations so that the keyway notches of each rotor lamination is aligned with the keyway notches of the other rotor laminations. In another embodiment, however, the method 1220 does NOT comprise the blocks 1222 and 1224, and instead the core of the rotor is a solid core. In this embodiment, the apertures defined by the solid core may be machined into the solid core.

At block 1226, the method 1220 comprises inserting a first permanent magnet element into the first apertures of the rotor laminations or the solid rotor core. At block 1228, the method 1220 comprises inserting a second permanent magnet element into the second apertures of the rotor laminations or the solid rotor core. In an embodiment, inserting the first permanent magnet element comprises inserting a first plurality of magnet segments into the first apertures of the rotor laminations and inserting the second permanent magnet element comprises inserting a second plurality of magnet segments into the second apertures of the rotor laminations while staggering the second plurality of magnet segments relative to the first plurality of magnet segments.

At block 1230, the method 1220 comprises inserting a drive shaft into the central openings of each of the rotor laminations or of the solid rotor core. At block 1232, the method 1220 comprises inserting a driveshaft key into the keyway notch of each of the rotor laminations or the solid rotor core, thereby securing a rotor assembly to the drive shaft, wherein the rotor assembly comprises the rotor laminations or solid rotor core, the first permanent magnet element, and the second permanent magnet element. At block 1234, the method 1220 comprises inserting the drive shaft and the rotor assembly into a longitudinal opening of a stator. In an embodiment, before performing the action at block 1234 of inserting the drive shaft and the rotor assembly into the longitudinal opening of the stator, the method 1220 further comprises removing a conventional induction motor rotor assembly from the longitudinal opening of the stator. At block 1236, the method 1220 comprises securing the rotor assembly within the stator by bearings that receive the drive shaft.

ADDITIONAL DISCLOSURE

The following are non-limiting, specific embodiments in accordance with the present disclosure:

A first embodiment, which is a downhole electric submersible pump (ESP) assembly comprising a hybrid permanent magnet motor (PMM) comprising a first drive shaft, a stator, a rotor comprising a first permanent magnet element, a second permanent magnet element, and an induction squirrel cage, wherein the rotor is mechanically coupled to the first drive shaft and disposed within the stator; a seal section having a second drive shaft coupled to the first drive shaft; and a pump assembly having a third drive shaft coupled to the second drive shaft.

A second embodiment, which is the downhole ESP assembly of the first embodiment, wherein the rotor comprises a plurality of laminations that define a first magnet pocket that extends axially parallel to the first drive shaft and completely encloses a plurality of longitudinal faces of the first permanent magnet element and define a second magnet pocket that extends axially parallel to the first drive shaft and completely encloses a plurality of longitudinal faces of the second permanent magnet element.

A third embodiment, which is the downhole ESP assembly of the second embodiment, wherein the first magnet pocket defines a first flux barrier and a second flux barrier and the second magnet pocket defines a third flux barrier and a fourth flux barrier.

A fourth embodiment, which is the downhole ESP assembly of the second or the third embodiments, wherein the laminations define a plurality of flux barriers that extend axially parallel to the first drive shaft outside of the first and second magnet pockets.

A fifth embodiment, which is the downhole ESP assembly of any of the second through the fourth embodiments, wherein the laminations define a fifth flux barrier, a sixth flux barrier, a seventh flux barrier, and an eighth flux barrier, wherein the laminations define a first rib between the fifth flux barrier and the sixth flux barrier, and wherein the laminations define a second rib between the seventh flux barrier and the eighth flux barrier A sixth embodiment, which is the downhole ESP assembly of the fifth embodiment, wherein the fifth flux barrier is filled with a first filler structure, the sixth flux barrier is filled with a second filler structure, the seventh flux barrier is filled with a third filler structure, and the eighth flux barrier is filled with a fourth filler structure.

A seventh embodiment, which is the downhole ESP assembly of the sixth embodiment, wherein the first, second, third, and fourth filler structures comprise polyether ether ketone (PEEK) material.

An eighth embodiment, which is the downhole ESP assembly of any of the first through the seventh embodiments, wherein each of the permanent magnet elements is cropped on a longitudinal surface of the permanent magnet element.

A ninth embodiment, which is the downhole ESP assembly of any of the first through the eighth embodiments, wherein the first permanent magnet element comprises a first plurality of magnet segments, the second permanent magnet element comprises a second plurality of magnet segments, and the first plurality of magnet segments are staggered longitudinally relative to the second plurality of magnet segments.

A tenth embodiment, which is the downhole ESP assembly of any of the first through the ninth embodiments, wherein the first permanent magnet element and the second permanent magnet element comprise samarium cobalt (SmCo).

An eleventh embodiment, which is the downhole ESP assembly of any of the first through the ninth embodiments, wherein the first permanent magnet element and the second permanent magnet element comprise neodymium iron boron (NdFeB).

A twelfth embodiment, which is the downhole ESP assembly of any of the first through the eleventh embodiments, wherein the rotor further comprises a third permanent magnet element and a fourth permanent magnet element.

A thirteenth embodiment, which is the downhole ESP assembly of any of the first through the twelfth embodiments, wherein the rotor comprises a plurality of rotor modules, wherein each rotor module is mechanically coupled to the first drive shaft, is disposed within the stator, and comprises at least two permanent magnet elements and a rotor module induction squirrel cage.

A fourteenth embodiment, which is a method of assembling a downhole hybrid permanent magnet motor, comprising aligning a plurality of rotor laminations, wherein each rotor lamination defines a plurality of apertures, wherein each of the plurality of apertures comprises a first aperture configured to receive a first permanent magnet element, a second aperture configured to receive a second permanent magnet element, a plurality of conductor apertures configured to receive squirrel cage conductors, and a central opening having a keyway notch configured to receive a driveshaft key, so that the keyway notches of each rotor lamination is aligned with the keyway notches of the other rotor laminations; inserting a first permanent magnet element into the first apertures of the rotor laminations; inserting a second permanent magnet element into the second apertures of the rotor laminations; inserting a plurality of squirrel cage conductors into the conductor apertures of the rotor laminations; installing a first end ring over a first end of the squirrel cage conductors; installing a second end ring over a second end of the squirrel cage conductors; inserting a drive shaft into the central openings of each of the rotor laminations; inserting a driveshaft key into the keyway notch of each of the rotor laminations, thereby securing a rotor assembly to the drive shaft, wherein the rotor assembly comprises the rotor laminations, the first permanent magnet element, the second permanent magnet element, the squirrel cage conductors, the first end ring, and the second end ring; and inserting the drive shaft and the rotor assembly into a longitudinal opening of a stator.

A fifteenth embodiment, which is the method of the fourteenth embodiment, further comprising, before performing the action of inserting the drive shaft and the rotor assembly into the longitudinal opening of the stator, removing a conventional induction motor rotor assembly from the longitudinal opening of the stator.

A sixteenth embodiment, which is the method of the fourteenth or the fifteenth embodiment, wherein each rotor lamination defines a plurality of flux barrier apertures located outside of the first aperture, the second aperture, and the plurality of conductor apertures.

A seventeenth embodiment, which is the method of the sixteenth embodiment, further comprising installing a filler structure into each of the plurality of flux barrier apertures.

An eighteenth embodiment, which is the method of any of the fifteenth through the seventeenth embodiment, wherein the first aperture defines a first flux barrier and a second flux barrier that does not receive the first permanent magnet element and wherein the second aperture defines a third flux barrier and a fourth flux barrier that does not receive the second permanent magnet element.

A nineteenth embodiment, which is the method of any of the fifteenth through the eighteenth embodiments, wherein inserting the first permanent magnet element comprises inserting a first plurality of magnet segments into the first apertures of the rotor laminations and inserting the second permanent magnet element comprises inserting a second plurality of magnet segments into the second apertures of the rotor laminations while staggering the second plurality of magnet segments relative to the first plurality of magnet segments.

A twentieth embodiment, which is the method of any of the fifteenth through the nineteenth embodiments, wherein installing the first end ring over the first end of the squirrel cage conductors comprises electrically connecting the first end ring to a first set of ends of the squirrel cage conductors by soldering or braising and wherein installing the second end ring over the second end of the squirrel cage conductors comprises electrically connecting the second end ring to a second set of ends of the squirrel cage conductors by soldering or braising, where the second end of each squirrel cage conductor is at an opposite end from the first end of the squirrel cage conductor.

A twenty-first embodiment, which is a method of lifting production fluid in a wellbore, comprising assembling an electric submersible pump (ESP) assembly at a wellbore, wherein the ESP assembly comprises a hybrid permanent magnet motor (PMM) and a pump assembly, wherein the hybrid PMM comprises a stator and a rotor, wherein the rotor comprises an induction squirrel cage, a first permanent magnet element, and a second permanent magnet element; mechanically coupling a discharge of the pump assembly to a production tubing; running the ESP assembly and production tubing into the wellbore; providing electrical power to the stator of the hybrid PMM; assisting start of the rotor of the hybrid PMM by the induction squirrel cage; providing torque to the pump assembly by the first permanent magnet element and the second permanent magnet element; lifting the production fluid by the pump assembly; and in response to changing mechanical loads transferred by the pump assembly to the hybrid PMM, stabilizing the rotational speed of the rotor by the induction squirrel cage.

A twenty-second embodiment, which is the method of the twenty-first embodiment, further comprising prompting magnetic flux produced by the first permanent magnet element to flow via the stator and from the stator to the second permanent magnet by flux barriers defined by magnet pockets defined by a plurality of laminations of the rotor, wherein a first magnet pocket receives the first permanent magnet element and a second magnet pocket receives the second permanent magnet element.

A twenty-third embodiment, which is the method of the twenty-second embodiment, wherein the magnetic flux produced by the first permanent magnet element is prompted to flow via the stator and from the stator to the second permanent magnet additionally by flux barriers defined by aligned apertures defined by the laminations of the rotor.

A twenty-third embodiment, which is the method of any of the twenty-first through the twenty-third embodiment, wherein the rotor in the hybrid PMM is a hybrid rotor and further comprising retrofitting the hybrid rotor into the stator before assembling the ESP assembly at the wellbore.

A twenty-fourth embodiment, which is the method of the twenty-third embodiment, wherein retrofitting the hybrid rotor into the stator comprises removing a conventional rotor from the stator, inserting the hybrid rotor into the stator, and securing the hybrid rotor into stator.

A twenty-fifth embodiment, which is the method of the twenty-fourth embodiments, further comprising assembling the hybrid rotor, wherein the hybrid rotor is assembled in accordance with the method of any of the fourteenth through twentieth embodiments.

A twenty-sixth embodiment, which is the downhole ESP assembly of any of the first through the eleventh embodiments, wherein the hybrid PMM is a two-pole motor.

A twenty-seventh embodiment, which is the downhole ESP assembly of the twelfth embodiment, wherein the hybrid PMM is a four-pole motor.

A twenty-eighth embodiment, which is the method of assembling a downhole hybrid permanent magnet motor of any of the fourteenth through the twentieth embodiments, wherein the hybrid permanent magnet motor is a two-pole motor.

A twenty-ninth embodiment, which is the method of assembling a downhole hybrid permanent magnet motor of any of the fourteenth through the twentieth embodiments, wherein the hybrid permanent magnet motor is a four-pole motor.

A thirtieth embodiment, which is the method of lifting production fluid in the wellbore according to any of the twenty-first through the twenty-fifth embodiments, wherein the hybrid PMM is a two-pole motor.

A thirty-first embodiment, which is the method of lifting production fluid in the wellbore according to any of the twenty-first through the twenty-fifth embodiments, wherein the hybrid PMM is a four-pole motor.

A thirty-second embodiment, which is the downhole ESP assembly of the sixth embodiment, wherein the first filler structure, the second filler structure, the third filler structure, and the fourth filler structure each defines a channel configured to promote flow-through of dielectric oil.

A thirty-third embodiment, which is the downhole ESP assembly of the thirty-second embodiment, wherein each channel in the filler structures defines a scoop feature that is configured to urge dielectric oil to flow through the channel.

A thirty-fourth embodiment, which is the downhole ESP assembly of the thirty second embodiment, wherein a fluid mover is inserted into each channel in the filler structures that is configured to urge dielectric oil to flow through the channel.

A thirty-fifth embodiment, which is the downhole ESP assembly of the first embodiment, wherein the rotor comprises a solid core that defines a first magnet pocket that extends axially parallel to the first drive shaft and completely encloses a plurality of longitudinal faces of the first permanent magnet element and defines a second magnet pocket that extends axially parallel to the first drive shaft and completely encloses a plurality of longitudinal faces of the second permanent magnet element.

A thirty-sixth embodiment, which is a downhole electric submersible pump (ESP) assembly, comprising a permanent magnet motor (PMM) comprising a first drive shaft, a stator, and a rotor disposed within the stator and comprising a core coupled to the first drive shaft, wherein the core retains a first permanent magnet element within a first magnet pocket defined by the core that extends axially parallel to the first drive shaft and retains a second permanent magnet element within a second magnet pocket defined by the core that extends axially parallel to the first drive shaft; a seal section having a second drive shaft coupled to the first drive shaft; and a pump assembly having a third drive shaft coupled to the second drive shaft.

A thirty-seventh embodiment, which is the downhole ESP assembly of the thirty-sixth embodiment, wherein the first magnet pocket defines a first flux barrier and a second flux barrier and the second magnet pocket defines a third flux barrier and a fourth flux barrier.

A thirty-eighth embodiment, which is the downhole ESP assembly of either the thirty-sixth or thirty-seventh embodiment, wherein the core defines a plurality of flux barriers that extend axially parallel to the first drive shaft outside of the first and second magnet pockets.

A thirty-ninth embodiment, which is the downhole ESP assembly of the thirty-eighth embodiment, wherein the plurality of flux barriers outside of the first and second magnet pockets are filled with filler structures.

A fortieth embodiment, which is the downhole ESP assembly of any of the thirty-sixth through the thirty-ninth embodiment, wherein the core of the rotor of the PMM is a solid core.

A forty-first embodiment, which is the downhole ESP assembly of any of the thirty-sixth through the thirty-ninth embodiment, wherein the core of the rotor of the PMM comprises a plurality of laminations, each lamination defining apertures that define the first magnet pocket and the second magnet pocket when the laminations are aligned.

A forty-second embodiment, which is the downhole ESP assembly of any of the thirty-sixth through the forty-first embodiment, wherein each of the first permanent magnet element and the second permanent magnet element is cropped on a longitudinal surface of the permanent magnet element.

A forty-third embodiment, which is the downhole ESP assembly of any of the thirty-sixth through the forty-second embodiment, wherein the first permanent magnet element comprises a first plurality of magnet segments, the second permanent magnet element comprises a second plurality of magnet segments, and the first plurality of magnet segments are staggered longitudinally relative to the second plurality of magnet segments.

A forty-fourth embodiment, which is the downhole ESP assembly of any of the thirty-sixth through the forty-third embodiment, wherein the first permanent magnet element and the second permanent magnet element comprise samarium cobalt (SmCo).

A forty-fifth embodiment, which is the downhole ESP assembly of any of the thirty-sixth through the forty-third embodiment, wherein the first permanent magnet element and the second permanent magnet element comprise neodymium iron boron (NdFeB).

A forty-sixth embodiment, which is the downhole ESP assembly of any of the thirty-sixth through the forty-fifth embodiment, wherein the core further retains a third permanent magnet element within a third magnet pocket defined by the core that extends axially parallel to the first drive shaft and retains a fourth permanent magnet element within a fourth magnet pocket defined by the core that extends axially parallel to the first drive shaft.

A forty-seventh embodiment, which is a method of assembling a downhole permanent magnet motor (PMM), comprising aligning a plurality of rotor laminations, wherein each rotor lamination defines a plurality of apertures, wherein each of the plurality of apertures comprises a first aperture configured to receive a first permanent magnet element, a second aperture configured to receive a second permanent magnet element, and a central opening having a keyway notch configured to receive a driveshaft key, so that the keyway notches of each rotor lamination is aligned with the keyway notches of the other rotor laminations; inserting a first permanent magnet element into the first apertures of the rotor laminations; inserting a second permanent magnet element into the second apertures of the rotor laminations; inserting a drive shaft into the central openings of each of the rotor laminations; inserting a driveshaft key into the keyway notch of each of the rotor laminations, thereby securing a rotor assembly to the drive shaft, wherein the rotor assembly comprises the rotor laminations, the first permanent magnet element, and the second permanent magnet element; and inserting the drive shaft and the rotor assembly into a longitudinal opening of a stator.

A forty-eighth embodiment, which is the method of the forty-seventh embodiment, further comprising, before performing the action of inserting the drive shaft and the rotor assembly into the longitudinal opening of the stator, removing a conventional induction motor rotor assembly from the longitudinal opening of the stator.

A forty-ninth embodiment, which is the method of the forty-seventh or forty-eighth embodiment, wherein each rotor lamination defines a plurality of flux barrier apertures located outside of the first aperture, the second aperture, and the plurality of conductor apertures.

A fiftieth embodiment, which is the method of any of the forty-seventh through the forth-ninth embodiment, further comprising installing a filler structure into each of the plurality of flux barrier apertures.

A fifty-first embodiment, which is the method of the fiftieth embodiment, wherein each filler structure defines an interior channel and further comprising inserting a fluid mover into each of the interior channels of the filler structures.

A fifty-second embodiment, which is the method of the fifty-first embodiment, wherein the fluid movers define a scoop at an entrance of the channels.

A fifty-third embodiment, which is the method of the fifty-first embodiment, wherein each of the fluid movers is a hollow auger or a solid auger.

A fifty-fourth embodiment, which is the method of any of the forty-seventh through the fifty-third embodiment, wherein the first aperture defines a first flux barrier and a second flux barrier that do not receive the first permanent magnet element and wherein the second aperture defines a third flux barrier and a fourth flux barrier that do not receive the second permanent magnet element.

A fifty-fifth embodiment, which is the method of any of the forty-seventh through the fifty-fourth embodiment, wherein inserting the first permanent magnet element comprises inserting a first plurality of magnet segments into the first apertures of the rotor laminations and inserting the second permanent magnet element comprises inserting a second plurality of magnet segments into the second apertures of the rotor laminations while staggering the second plurality of magnet segments relative to the first plurality of magnet segments.

A fifty-sixth embodiment, which is the downhole ESP assembly of the thirty second embodiment, wherein each fluid mover is a hollow auger or a solid auger.

A fifty-seventh embodiment, which is the downhole ESP assembly of any of the sixth embodiment, the eighth through the thirteenth embodiment, or the thirty-second through the thirty-fifth embodiment, wherein the first, second, third, and fourth filler structures comprise aluminum.

A fifty-eighth embodiment, which is the downhole ESP assembly of any of the sixth embodiment, the eighth through the thirteenth embodiment, or the thirty-second through the thirty-fifth embodiment, wherein the first, second, third, and fourth filler structures comprise a solid aluminum structure.

A fifty-ninth embodiment, which is the downhole ESP assembly of any of the sixth embodiment, the eighth through the thirteenth embodiment, or the thirty-second through the thirty-fifth embodiment, wherein the first, second, third, and fourth filler structures comprise a hollow aluminum structure.

A sixtieth embodiment, which is the downhole ESP assembly of any of the sixth embodiment, the eighth through the thirteenth embodiment, or the thirty-second through the thirty-fifth embodiment, wherein the first, second, third, and fourth filler structures comprise a plastic material.

A sixty-first embodiment, which is the downhole ESP assembly of any of the sixth embodiment, the eighth through the thirteenth embodiment, or the thirty-second through the thirty-fifth embodiment, wherein the first, second, third, and fourth filler structures comprise a nylon material.

A sixty-second embodiment, which is the downhole ESP assembly of any of the sixth embodiment, the eighth through the thirteenth embodiment, or the thirty-second through the thirty-fifth embodiment, wherein the first, second, third, and fourth filler structures comprise a fluoropolymer material.

A sixty-third embodiment, which is the downhole ESP assembly of any of the sixth embodiment, the eighth through the thirteenth embodiment, or the thirty-second through the thirty-fifth embodiment, wherein the first, second, third, and fourth filler structures comprise a polyamide-imide material.

A sixty-fourth embodiment, which is the downhole ESP assembly of the thirty-ninth embodiment, wherein each filler structure defines an interior channel that promotes flow-through of dielectric oil.

A sixty-fifth embodiment, which is the downhole ESP assembly of the sixty-fourth embodiment, wherein a fluid mover is inserted into each interior channel of the filler structures.

A sixty-sixth embodiment, which is the downhole ESP assembly of the sixty-fifth embodiment, wherein each fluid mover is a hollow auger or a solid auger.

A sixty-seventh embodiment, which is the downhole ESP assembly of any of the thirty-ninth or sixty-fourth through sixty-sixth embodiment, wherein the first, second, third, and fourth filler structures comprise aluminum.

A sixty-eighth embodiment, which is the downhole ESP assembly of any of the thirty-ninth or sixty-fourth through sixty-sixth embodiment, wherein the first, second, third, and fourth filler structures comprise a solid aluminum structure.

A sixty-ninth embodiment, which is the downhole ESP assembly of any of the thirty-ninth or sixty-fourth through sixty-sixth embodiment, wherein the first, second, third, and fourth filler structures comprise a hollow aluminum structure.

A seventieth embodiment, which is the downhole ESP assembly of any of the thirty-ninth or sixty-fourth through sixty-sixth embodiment, wherein the first, second, third, and fourth filler structures comprise a plastic material.

A seventy-first embodiment, which is the downhole ESP assembly of any of the thirty-ninth or sixty-fourth through sixty-sixth embodiment, wherein the first, second, third, and fourth filler structures comprise a nylon material.

A seventy-second embodiment, which is the downhole ESP assembly of any of the thirty-ninth or sixty-fourth through sixty-sixth embodiment, wherein the first, second, third, and fourth filler structures comprise a fluoropolymer material.

A seventy-third embodiment, which is the downhole ESP assembly of any of the thirty-ninth or sixty-fourth through sixty-sixth embodiment, wherein the first, second, third, and fourth filler structures comprise a polyamide-imide material.

A seventy-fourth embodiment, which is a method of retrofitting a different type of rotor into an electric submersible pump (ESP) electric motor, comprising: removing a head from the ESP electric motor; removing a first rotor from a stator of an ESP electric motor, wherein the first rotor is a first rotor type selected from a group consisting of a conventional rotor type, a permanent magnet motor (PMM) rotor type, and a hybrid PMM rotor type; installing a second rotor into the stator of the ESP electric motor, wherein the second rotor is a second rotor type selected from the group consisting of the conventional rotor type, the PMM rotor type, and the hybrid PMM rotor type, wherein the second rotor type is different from the first rotor type; and installing the head onto the ESP electric motor. In some contexts, the conventional rotor type may be referred to as a conventional induction rotor type.

A seventy-fifth embodiment, which is the method of retrofitting a different type of rotor into an electric submersible pump (ESP) electric motor of the seventy-fourth embodiment, wherein the first rotor type is the conventional rotor type and the second rotor type is the hybrid PMM rotor type.

A seventy-sixth embodiment, which is the method of retrofitting a different type of rotor into an electric submersible pump (ESP) electric motor of the seventy-fourth embodiment, wherein the first rotor type is the conventional rotor type and the second rotor type is the PMM rotor type.

A seventy-seventh embodiment, which is the method of retrofitting a different type of rotor into an electric submersible pump (ESP) electric motor of the seventy-fourth embodiment, wherein the first rotor type is the PMM rotor type and the second rotor type is the hybrid PMM rotor type.

A seventy-eighth embodiment, which is the method of retrofitting a different type of rotor into an electric submersible pump (ESP) electric motor of the seventy-fourth embodiment, wherein the first rotor type is the PMM rotor type and the second rotor type is the conventional rotor type.

A seventy-ninth embodiment, which is the method of retrofitting a different type of rotor into an electric submersible pump (ESP) electric motor of the seventy-fourth embodiment, wherein the first rotor type is the hybrid PMM rotor type and the second rotor type is the PMM rotor type.

An eightieth embodiment, which is the method of retrofitting a different type of rotor into an electric submersible pump (ESP) electric motor of the seventy-fourth embodiment, wherein the first rotor type is the hybrid PMM rotor type and the second rotor type is the conventional rotor type.

An eighty-first embodiment, which is a method of assembling a downhole hybrid permanent magnet motor, comprising making a plurality of rotor laminations wherein each rotor lamination defines a plurality of apertures, wherein each of the plurality of apertures comprises a first aperture configured to receive a first permanent magnet element, a second aperture configured to receive a second permanent magnet element, a plurality of conductor apertures configured to receive squirrel cage conductors, and a central opening having a keyway notch configured to receive a driveshaft key; aligning the plurality of rotor laminations so that the keyway notches of each rotor lamination is aligned with the keyway notches of the other rotor laminations; inserting a first permanent magnet element into the first apertures of the rotor laminations; inserting a second permanent magnet element into the second apertures of the rotor laminations; inserting a plurality of squirrel cage conductors into the conductor apertures of the rotor laminations; installing a first end ring over a first end of the squirrel cage conductors; installing a second end ring over a second end of the squirrel cage conductors; inserting a drive shaft into the central openings of each of the rotor laminations; inserting a driveshaft key into the keyway notch of each of the rotor laminations, thereby securing a rotor assembly to the drive shaft, wherein the rotor assembly comprises the rotor laminations, the first permanent magnet element, the second permanent magnet element, the squirrel cage conductors, the first end ring, and the second end ring; inserting the drive shaft and the rotor assembly into a longitudinal opening of a stator; and securing the rotor assembly within the stator by bearings that receive the drive shaft.

An eighty-second embodiment, which is a method of assembling a downhole permanent magnet motor (PMM), comprising making a plurality of rotor laminations wherein each rotor lamination defines a plurality of apertures, wherein each of the plurality of apertures comprises a first aperture configured to receive a first permanent magnet element, a second aperture configured to receive a second permanent magnet element, and a central opening having a keyway notch configured to receive a driveshaft key; aligning the plurality of rotor laminations so that the keyway notches of each rotor lamination is aligned with the keyway notches of the other rotor laminations; inserting a first permanent magnet element into the first apertures of the rotor laminations; inserting a second permanent magnet element into the second apertures of the rotor laminations; inserting a drive shaft into the central openings of each of the rotor laminations; inserting a driveshaft key into the keyway notch of each of the rotor laminations, thereby securing a rotor assembly to the drive shaft, wherein the rotor assembly comprises the rotor laminations, the first permanent magnet element, and the second permanent magnet element; inserting the drive shaft and the rotor assembly into a longitudinal opening of a stator; and securing the rotor assembly within the stator by bearings that receive the drive shaft.

An eighty-third embodiment, which is a method of producing fluid from a wellbore, comprising: placing a downhole electric submersible pump (ESP) assembly of any of the first through thirteenth, twenty-sixth, twenty-seventh, thirty-second through forty-sixth, or fifty-sixth through seventy-third embodiments into the wellbore and operating the ESP assembly to pump fluid (e.g., hydrocarbons) from a location within the wellbore to a location external to the wellbore.

An eighty-fourth embodiment, which is a method of producing fluid from a wellbore, comprising: placing a downhole electric submersible pump (ESP) assembly produced by any of the assembly methods of the fourteenth through twentieth, twenty-eighth, twenty-ninth, or forth-seventh through fifty-fifth embodiments into the wellbore and operating the ESP assembly to pump fluid (e.g., hydrocarbons) from a location within the wellbore to a location external to the wellbore.

An eighty-fifth embodiment, which is a method of producing fluid from a wellbore, comprising: placing a downhole electric submersible pump (ESP) assembly produced by any of the retrofitting methods of the seventy-fourth through eightieth embodiments into the wellbore and operating the ESP assembly to pump fluid (e.g., hydrocarbons) from a location within the wellbore to a location external to the wellbore.

An eighty-sixth embodiment, which is a method of producing fluid from a wellbore, comprising: removing an electrical submersible pump (ESP) assembly from a wellbore; retrofitting the ESP assembly by any of the retrofitting methods of the seventy-fourth through eightieth embodiments to produce a retrofitted ESP assembly; and placing the retrofitted ESP assembly into the same or different wellbore; and operating the ESP assembly to pump fluid (e.g., hydrocarbons) from a location within the wellbore to a location external to the wellbore.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A downhole electric submersible pump (ESP) assembly, comprising:
a hybrid permanent magnet motor (PMM) comprising:
a first drive shaft,
a stator, a rotor comprising at least one hybrid rotor module, wherein each hybrid rotor module comprises a first permanent magnet element, a second permanent magnet element, and an induction squirrel cage, wherein the rotor is mechanically coupled to the first drive shaft and disposed within the stator, wherein each hybrid rotor module comprises a plurality of laminations that define a first magnet pocket that extends axially parallel to the first drive shaft and completely encloses a plurality of longitudinal faces of the first permanent magnet element and define a second magnet pocket that extends axially parallel to the first drive shaft and completely encloses a plurality of longitudinal faces of the second permanent magnet element, wherein the laminations define a first flux barrier, a second flux barrier, a third flux barrier, and a fourth flux barrier, wherein the laminations define a first rib between the first flux barrier and the second flux barrier, and wherein the laminations define a second rib between the third flux barrier and the fourth flux barrier, wherein the first flux barrier is filled with a first filler rod, the second flux barrier is filled with a second filler rod, the third flux barrier is filled with a third filler rod, and the fourth flux barrier is filled with a fourth filler rod, wherein each of the first filler rod, the second filler rod, the third filler rod, and the fourth filler rod comprises non-magnetic material, and wherein the first filler rod, the second filler rod, the third filler rod, and the fourth filler rod each defines an open channel that extends axially from a first end of the filler rod to an opposite end of the filler rod;

a seal section having a second drive shaft coupled to the first drive shaft; and a pump assembly having a third drive shaft coupled to the second drive shaft.

2. The downhole ESP assembly of claim 1, wherein the first magnet pocket defines a first fifth flux barrier and a sixth flux barrier and the second magnet pocket defines a third seventh flux barrier and an eighth flux barrier.

3. The downhole ESP assembly of claim 1, wherein each channel in the filler rods defines a scoop that is configured to promote flow-through of dielectric oil.

4. The downhole ESP assembly of claim 1, wherein the first, second, third, and fourth filler rods comprise polyether ether ketone (PEEK) material.

5. The downhole ESP assembly of claim 1, wherein each of the permanent magnet elements defines an arcuate radial cross-section, and wherein each of the permanent magnet elements has a cropped surface at a middle of its arcuate radial cross-section that extends axially from a first axial end of the permanent magnet element to an opposite axial end of the permanent magnet element.

6. The downhole ESP assembly of claim 1, wherein the first permanent magnet element comprises a first plurality of magnet segments, the second permanent magnet element comprises a second plurality of magnet segments, and the first plurality of magnet segments are staggered axially relative to the second plurality of magnet segments.

7. The downhole ESP assembly of claim 1, wherein the first permanent magnet element and the second permanent magnet element comprise samarium cobalt (SmCo).

8. The downhole ESP assembly of claim 1, wherein the first permanent magnet element and the second permanent magnet element comprise neodymium iron boron (NdFeB).

9. The downhole ESP assembly of claim 1, wherein each hybrid rotor module further comprises a third permanent magnet element and a fourth permanent magnet element.

10. A method of assembling a downhole hybrid permanent magnet motor, comprising:

aligning a plurality of rotor laminations, wherein the laminations define a first magnet pocket that extends axially, define a second magnet pocket that extends axially, define a first flux barrier, define a second flux barrier, define a third flux barrier, define a fourth flux barrier, define a first rib between the first flux barrier and the second flux barrier, define a second rib between the third flux barrier and the fourth flux barrier, define a plurality of conductor apertures configured to receive squirrel cage conductors, and a central opening having a keyway notch configured to receive a driveshaft key, so that the keyway notches of each rotor lamination is aligned with the keyway notches of the other laminations;

inserting a first permanent magnet element into the first magnet pocket of the laminations, wherein the first magnet pocket completely encloses a plurality of longitudinal faces of the first permanent magnet element;

inserting a second permanent magnet element into the second magnet pocket of the rotor laminations, wherein the second magnet pocket completely encloses a plurality of longitudinal faces of the second permanent magnet element;

inserting a first filler rod in the first flux barrier;

inserting a second filler rod in the second flux barrier;

inserting a third filler rod in the third flux barrier;

inserting a fourth filler rod in the fourth flux barrier, wherein each of the first filler rod, the second filler rod, the third filler rod, and the fourth filler rod comprises non-magnetic material, and wherein the first filler rod, the second filler rod, the third filler rod, and the fourth filler rod each defines an open channel that extends axially from a first end of the filler rod to an opposite end of the filler rod;

inserting a plurality of squirrel cage conductors into the conductor apertures of the rotor laminations;

installing a first end ring over a first end of the squirrel cage conductors;

installing a second end ring over a second end of the squirrel cage conductors;

inserting a drive shaft into the central openings of each of the rotor laminations, wherein the first magnet pocket and the second magnet pocket are parallel to the drive shaft;

inserting a driveshaft key into the keyway notch of each of the rotor laminations, thereby securing a hybrid rotor module assembly to the drive shaft, wherein the hybrid rotor module assembly comprises the laminations, the first permanent magnet element, the second permanent magnet element, the squirrel cage conductors, the first end ring, and the second end ring; and inserting the drive shaft and the hybrid rotor module assembly into a longitudinal opening of a stator, wherein the downhole hybrid permanent magnet motor is configured for use in a downhole electric submersible pump (ESP) assembly that comprises a seal section having a second drive shaft configured to be coupled to the drive shaft of the hybrid permanent magnet motor and pump assembly having a third drive shaft configured to be coupled to the second drive shaft.

11. The method of claim 10, further comprising, before performing the action of inserting the drive shaft and the hybrid rotor module assembly into the longitudinal opening of the stator, removing a conventional induction motor rotor assembly from the longitudinal opening of the stator.

12. The method of claim 10, wherein the first magnet pocket defines a first flux barrier and a second flux barrier that do not receive the first permanent magnet element and wherein the second magnet pocket defines a third flux barrier and a fourth flux barrier that do not receive the second permanent magnet element.

13. The method of claim 10, wherein inserting the first permanent magnet element comprises inserting a first plurality of magnet segments into the first magnet pocket of the laminations and inserting the second permanent magnet element comprises inserting a second plurality of magnet segments into the second magnet pocket of the rotor laminations while staggering the second plurality of magnet segments relative to the first plurality of magnet segments.

14. A method of lifting production fluid in a wellbore, comprising:
assembling a downhole electric submersible pump (ESP) assembly at a wellbore, wherein the downhole ESP assembly comprises a hybrid permanent magnet motor (PMM) having a first drive shaft, a seal section having a second drive shaft coupled to the first drive shaft, and a pump assembly having a third drive shaft coupled to the second drive shaft, wherein the hybrid PMM further comprises a stator and a rotor, wherein the rotor comprises at least one hybrid rotor module, wherein each hybrid rotor module comprises an induction squirrel cage, a first permanent magnet element, and a second permanent magnet element, wherein the rotor is mechanically coupled to the first drive shaft and disposed within the stator wherein each hybrid rotor module comprises a plurality of laminations that define a first magnet pocket that extends axially parallel to the first drive shaft and completely encloses a plurality of longitudinal faces of the first permanent magnet element and define a second magnet pocket that extends axially parallel to the first drive shaft and completely encloses a plurality of longitudinal faces of the second permanent magnet element, wherein the laminations define a first flux barrier, a second flux barrier, a third flux barrier, and a fourth flux barrier, wherein the laminations define a first rib between the first flux barrier and the second flux barrier, and wherein the laminations define a second rib between the third flux barrier and the fourth flux barrier, wherein the first flux barrier is filled with a first filler rod, the second flux barrier is filled with a second filler rod, the third flux barrier is filled with a third filler rod, and the fourth flux barrier is filled with a fourth filler rod, wherein each of the first filler rod, the second filler rod, the third filler rod, and the fourth filler rod comprises non-magnetic material, and wherein the first filler rod, the second filler rod, the third filler rod, and the fourth filler rod each defines an open channel that extends axially from a first end of the filler rod to an opposite end of the filler rod;

mechanically coupling a discharge of the pump assembly to a production tubing;

running the downhole ESP assembly and production tubing into the wellbore;

providing electrical power to the stator of the hybrid PMM;

assisting start of the rotor of the hybrid PMM by the induction squirrel cage;

providing torque to the pump assembly by the first permanent magnet element and the second permanent magnet element;

lifting the production fluid by the pump assembly; and in response to changing mechanical loads transferred by the pump assembly to the hybrid PMM, stabilizing the rotational speed of the rotor by the induction squirrel cage.

15. The method of claim 14, further comprising prompting magnetic flux produced by the first permanent magnet element to flow via the stator and from the stator to the second permanent magnet by flux barriers defined by the first and second magnet pockets.

16. The method of claim 15, wherein the magnetic flux produced by the first permanent magnet element is prompted to flow via the stator and from the stator to the second permanent magnet additionally by the first, second, third, and fourth flux barriers.

17. The method of claim 14, wherein the production fluid is hydrocarbon fluid.

18. The method of claim 14, wherein the production fluid is geothermal fluid.

19. The downhole ESP assembly of claim 1, wherein the laminations comprise magnetic metal.

20. The downhole ESP assembly of claim 19, wherein the magnetic metal of the laminations comprises steel, silicon steel, an alloy of iron, nickel and cobalt, an alloy of iron and nickel, or an alloy of iron and cobalt.

* * * * *